US012726040B2

(12) United States Patent
Ninomiya et al.

(10) Patent No.: US 12,726,040 B2
(45) Date of Patent: Sep. 1, 2026

(54) CIRCUIT DEVICE AND ELECTRONIC DEVICE

(71) Applicant: SEIKO EPSON CORPORATION, Tokyo (JP)

(72) Inventors: Masaya Ninomiya, Matsumoto (JP); Katsumi Okina, Fujimi-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 592 days.

(21) Appl. No.: 18/455,807

(22) Filed: Aug. 25, 2023

(65) Prior Publication Data

US 2024/0079898 A1 Mar. 7, 2024

(30) Foreign Application Priority Data

Aug. 29, 2022 (JP) ................................ 2022-135674

(51) Int. Cl.
*H02J 7/94* (2026.01)
*H02J 7/40* (2026.01)

(52) U.S. Cl.
CPC . *H02J 7/94* (2026.01); *H02J 7/40* (2026.01)

(58) Field of Classification Search
CPC ........ H02J 7/90; H02J 7/94; H02J 7/40; H02J 7/42; H02J 7/62
See application file for complete search history.

(56) References Cited

U.S. PATENT DOCUMENTS 7,615,965 B2 * 11/2009 Popescu-Stanesti ...... H02J 1/08 307/66
10,673,268 B2 * 6/2020 Xu .......................... G05F 1/462
10,686,323 B2 * 6/2020 Sakurai ................... H02J 7/342
10,958,088 B2 * 3/2021 Kwak ....................... H02J 7/42
10,971,942 B2 * 4/2021 Jung ................. H01M 10/4257
11,088,549 B2 * 8/2021 Lim ........................ H02J 7/575
2009/0115374 A1 * 5/2009 Noda ........................ H02J 1/10 320/138
2014/0009120 A1 * 1/2014 Kim .......................... H02J 7/02 320/138
2014/0285147 A1 9/2014 Sawada et al.
2016/0087472 A1 * 3/2016 Sattinger ................... H02J 7/02 320/108
2020/0044458 A1 * 2/2020 Yoon ....................... G06F 1/263
(Continued)

FOREIGN PATENT DOCUMENTS

JP 10-28338 A 1/1998
JP 2013-99155 A 5/2013

*Primary Examiner* — Jared Fureman
(74) *Attorney, Agent, or Firm* — Rankin, Hill & Clark LLP

(57) ABSTRACT

A circuit device includes: a current source circuit; a first charging circuit; a second charging circuit; and a control circuit. The control circuit controls, when a current setting value is in a first current range, supply of a first charging current from the first charging circuit to a charging node. The control circuit controls, when the current setting value is in a second current range on a current side higher than the first current range, supply of a second charging current from the second charging circuit to the charging node. The control circuit sets both the first charging current and the second charging current to a non-supply state during a switching period between the first current mode and the second current mode.

10 Claims, 15 Drawing Sheets

(56) References Cited

U.S. PATENT DOCUMENTS

| | | | | |
|---|---|---|---|---|
| 2023/0268757 | A1* | 8/2023 | Ninomiya | H02J 7/94 320/162 |
| 2024/0047987 | A1* | 2/2024 | Ninomiya | H02J 7/94 |
| 2024/0079897 | A1* | 3/2024 | Ninomiya | H02J 7/933 |
| 2024/0250538 | A1* | 7/2024 | Cao | G01R 31/3644 |
| 2025/0300478 | A1* | 9/2025 | Ninomiya | H02J 7/94 |

* cited by examiner 200
10
TBAT
VBAT
NBAT
IBAT
100
CIRCUIT DEVICE
190
RS
TS1
TS2
VCSR
NCSR
150
REFERENCE VOLTAGE GENERATION CIRCUIT
VREF
ICH1
140
110
FIRST CHARGING CIRCUIT
IS1
ICH2
CURRENT SOURCE CIRCUIT
120
SECOND CHARGING CIRCUIT
IS2
XONL
XONS
QDA
170
STORAGE UNIT
160
CONTROL CIRCUIT
VIN
NIN
INDA

FIG. 2

| INDA | <THR | ≥THR |
| --- | --- | --- |
| XONL | H | L(Active) |
| XONS | L(Active) | H |
| QDA | STV1=GA1×INDA+OF1 | STV2=GA2×INDA+OF2 |
| IBAT | ICH1(STV1) | ICH2(STV2) |

QDA[12:0]
D1 0 1111 1111 1111
↓
DPC 0 0000 0000 0000
↓
D2 1 0000 0000 0000

PC PC
QDA[12:0] D1 D2 D3
DPC DPC
TIME

FIG. 11

XONL=L(Active): SECOND CURRENT MODE

| STV2 | [20] | [19] | [18] | [17] | [16] | [15] | [14] | [13] | [12] | [11] | [10] | [9] | [8] | [7] | [6] | [5] | [4] | [3] | [2] | [1] | [0] |
|---|---|---|---|---|---|---|---|---|---|---|---|---|---|---|---|---|---|---|---|---|---|
| QDA | [12] | [11] | [10] | [9] | [8] | [7] | [6] | [5] | [4] | [3] | [2] | [1] | [0] | | | | | | | | |
| RG | 13 | 12 | 11 | 10 | 9 | 8 | 7 | 6 | 5 | 4 | 3 | 2 | 1 | | | | | | | | |
| RESISTANCE RATIO | 0.25 | 0.5 | 1 | 2 | 4 | 8 | 16 | 32 | 64 | 128 | 256 | 512 | 1024 | | | | | | | | |

XONS=L(Active): FIRST CURRENT MODE

| STV1 | [17] | [16] | [15] | [14] | [13] | [12] | [11] | [10] | [9] | [8] | [7] | [6] | [5] | [4] | [3] | [2] | [1] | [0] |
|---|---|---|---|---|---|---|---|---|---|---|---|---|---|---|---|---|---|---|
| QDA | [12] | [11] | [10] | [9] | [8] | [7] | [6] | [5] | [4] | [3] | [2] | [1] | [0] | | | | | |
| RG | 13 | 12 | 11 | 10 | 9 | 8 | 7 | 6 | 5 | 4 | 3 | 2 | 1 | | | | | |
| RESISTANCE RATIO | 0.25 | 0.5 | 1 | 2 | 4 | 8 | 16 | 32 | 64 | 128 | 256 | 512 | 1024 | | | | | |

FIG. 12

XONS=L(Active): FIRST CURRENT MODE

| PARAMETER | VALUE | FORMULA |
|---|---|---|
| VREF | 1.25V | |
| RG4 | 5kΩ × 128 | |
| IS1 RESOLUTION | 1.95μA | VREF/RG4 |
| IS1max | 0.5mA | IS1 RESOLUTION × 255 |
| RRSS1 | 32Ω | |
| RCSI1 | 700Ω | |
| FIRST GAIN | 21.9 | RCSI1/RRSS1 |
| ICH1 RESOLUTION | 42.7μA | IS1 RESOLUTION × FIRST GAIN |
| ICH1max | 10.9mA | IS1max × FIRST GAIN |
| RCSI1 MINIMUM POTEN-TIAL DIFFERENCE | 1.37mV | RCSI1 × IS1 RESOLUTION |

XONL=L(Active): SECOND CURRENT MODE

| PARAMETER | VALUE | FORMULA | RELATIONSHIP |
|---|---|---|---|
| RG1 | 5kΩ × 1024 | | RG4 × 8 |
| IS2 RESOLUTION | 0.244μA | VREF/RG1 | IS1 RESOLUTION/8 |
| IS2min | 62.5μA | IS2 RESOLUTION × 256 | |
| IS2max | 2mA | IS2 RESOLUTION × 8191 | IS1max × 4 |
| RRSS2 | 1Ω | | |
| RCSI2 | 175Ω | | |
| SECOND GAIN | 175 | RCSI2/RRSS2 | FIRST GAIN × 8 |
| ICH2 RESOLUTION | 42.7μA | IS2 RESOLUTION × SECOND GAIN | ICH1 RESOLUTION |
| ICH2max | 350mA | IS2max × SECOND GAIN | ICH1max × 32 |
| RCSI2 MINIMUM POTEN-TIAL DIFFERENCE | 10.9mV | RCSI2 × IS2min | |

200
120
SECOND CHARGING CIRCUIT
190
VIN
NIN
ICH2
VCSR
NCSR
TS1
IBAT
VBAT
NBAT
TBAT
RS
10
TS2
110
FIRST CHARGING CIRCUIT
ICH1
170
STORAGE UNIT
160
IS2
IS1
140
150
XONL
142
141
XONS
SECOND CURRENT SOURCE CIRCUIT
FIRST CURRENT SOURCE CIRCUIT
REFERENCE VOLTAGE GENERATION CIRCUIT
INDA
CONTROL CIRCUIT
QDA1
VREF
QDA2
CURRENT SOURCE CIRCUIT
CIRCUIT DEVICE
100

*FIG. 14*

| INDA | <THR | ≥THR |
|---|---|---|
| XONL | H | L(Active) |
| XONS | L(Active) | H |
| QDA1 | STV1=GA1×INDA+OF1 | 0 |
| QDA2 | 0 | STV2=GA2×INDA+OF2 |
| IBAT | ICH1(STV1) | ICH2(STV2) |

110
TA1
OPA1
VIN
NIN
XONS
VCS1
NCS1
RCSI1
VCSI1
NCSI1
RRSS1
ICH1
VCSR
NCSR
190
BACKFLOW PREVENTION CIRCUIT
IBAT
VBAT
NBAT
141
IS1
TB1
OPB1
VREF
VS1
NS1
RC13
TC13
QDA1[12]
RC2
TC2
QDA1[1]
RC1
TC1
QDA1[0]

190
BACKFLOW PREVENTION CIRCUIT
VBAT
NBAT
IBAT
VCSR
NCSR
ICH2
120
TA2
OPA2
RRSS2
VCS2
NCS2
RCSI2
VCSI2
NCSI2
IS2
142
TB2
OPB2
VS2
NS2
RD1
TD1
QDA2[0]
RD2
TD2
QDA2[1]
RD13
TD13
QDA2[12]
VIN
NIN
XONL
VREF

XONL=L(Active): SECOND CURRENT MODE

| STV2 | [20] | [19] | [18] | [17] | [16] | [15] | [14] | [13] | [12] | [11] | [10] | [9] | [8] | [7] | [6] | [5] | [4] | [3] | [2] | [1] | [0] |
|---|---|---|---|---|---|---|---|---|---|---|---|---|---|---|---|---|---|---|---|---|---|
| QDA2 | [12] | [11] | [10] | [9] | [8] | [7] | [6] | [5] | [4] | [3] | [2] | [1] | [0] | | | | | | | | |
| RD | 13 | 12 | 11 | 10 | 9 | 8 | 7 | 6 | 5 | 4 | 3 | 2 | 1 | | | | | | | | |
| RESISTANCE RATIO | 0.25 | 0.5 | 1 | 2 | 4 | 8 | 16 | 32 | 64 | 128 | 256 | 512 | 1024 | | | | | | | | |

XONS=L(Active): FIRST CURRENT MODE

| STV1 | [17] | [16] | [15] | [14] | [13] | [12] | [11] | [10] | [9] | [8] | [7] | [6] | [5] | [4] | [3] | [2] | [1] | [0] |
|---|---|---|---|---|---|---|---|---|---|---|---|---|---|---|---|---|---|---|
| QDA1 | [12] | [11] | [10] | [9] | [8] | [7] | [6] | [5] | [4] | [3] | [2] | [1] | [0] | | | | | |
| RC | 13 | 12 | 11 | 10 | 9 | 8 | 7 | 6 | 5 | 4 | 3 | 2 | 1 | | | | | |
| RESISTANCE RATIO | 0.25 | 0.5 | 1 | 2 | 4 | 8 | 16 | 32 | 64 | 128 | 256 | 512 | 1024 | | | | | |

CIRCUIT DEVICE AND ELECTRONIC DEVICE

The present application is based on, and claims priority from JP Application Serial Number 2022-135674, filed Aug. 29, 2022, the disclosure of which is hereby incorporated by reference herein in its entirety.

BACKGROUND

1. Technical Field

The present disclosure relates to a circuit device and an electronic device.

2. Related Art

JP-A-10-028338 discloses a charging device that charges a secondary battery from two charging power supplies having different voltages. The voltage of one power supply is slightly lower than a reference voltage when the secondary battery is charged, and the voltage of the other power supply is higher than the reference voltage. The charging device detects a battery voltage, and charges the battery by the two power supplies when the battery voltage is lower than the voltages of the two power supplies. When the secondary battery is charged to a certain extent and the battery voltage exceeds the voltage of the power supply having a lower voltage, the charging device charges the secondary battery only by the power supply having a higher voltage. In JP-A-10-028338, a charging current decreases as the secondary battery is charged, and the charging is terminated when the charging current is detected. When the secondary battery is charged to a certain extent, the charging power supply is switched from two to one based on the battery voltage, thereby improving detection accuracy of the charging current.

In a circuit for constant-current charging of a battery, it may be difficult to handle a large charging current to a low charging current. For example, when a maximum value of the charging current that can be set is increased, a resolution of a current setting decreases or a scale of a current source circuit is increased.

SUMMARY

An aspect of the present disclosure relates to a circuit device including: a current source circuit; a first charging circuit configured to supply, based on an output current of the current source circuit, a first charging current, which is a constant current, as a charging current to a charging node; a second charging circuit configured to supply, based on the output current of the current source circuit, a second charging current, which is a constant current greater than the first charging current, as the charging current to the charging node; and a control circuit. The control circuit controls, when a current setting value for setting a current value of the charging current is in a first current range, a first current mode in which the first charging current having a current value indicated by the current setting value is supplied from the first charging circuit to the charging node, controls, when the current setting value is in a second current range on a current side higher than the first current range, a second current mode in which the second charging current having a current value indicated by the current setting value is supplied from the second charging circuit to the charging node, and sets both the first charging current and the second charging current to a non-supply state during a switching period between the first current mode and the second current mode.

Another aspect according to the present disclosure relates to an electronic device including the circuit device as described above and a battery coupled to the charging node.

BRIEF DESCRIPTION OF THE DRAWINGS

FIG. 2 shows an operation explanatory diagram of a control circuit according to the first embodiment.

FIG. 3 is a waveform example showing a problem in switching between a first current mode and a second current mode.

FIG. 4 shows a waveform example of a first enable signal and a second enable signal according to the first embodiment.

FIG. 11 is a diagram showing resistance ratios and operations of the current source circuit according to the first embodiment.

FIG. 12 shows parameter examples of the first charging circuit, the second charging circuit, and the current source circuit.

FIG. 14 shows an operation explanatory diagram of a control circuit according to the second embodiment.

FIG. 17 shows a waveform example of a first current source control value and a second current source control value according to the second embodiment.

FIG. 18 is a diagram showing resistance ratios and operations of the first current source circuit and the second current source circuit according to the second embodiment.

DESCRIPTION OF EMBODIMENTS

Hereinafter, preferred embodiments according to the present disclosure will be described in detail. The embodiments to be described below do not unduly limit contents described in the claims, and all configurations described in the embodiment are not necessarily essential constituent elements.

1. First Embodiment

Figure 1:
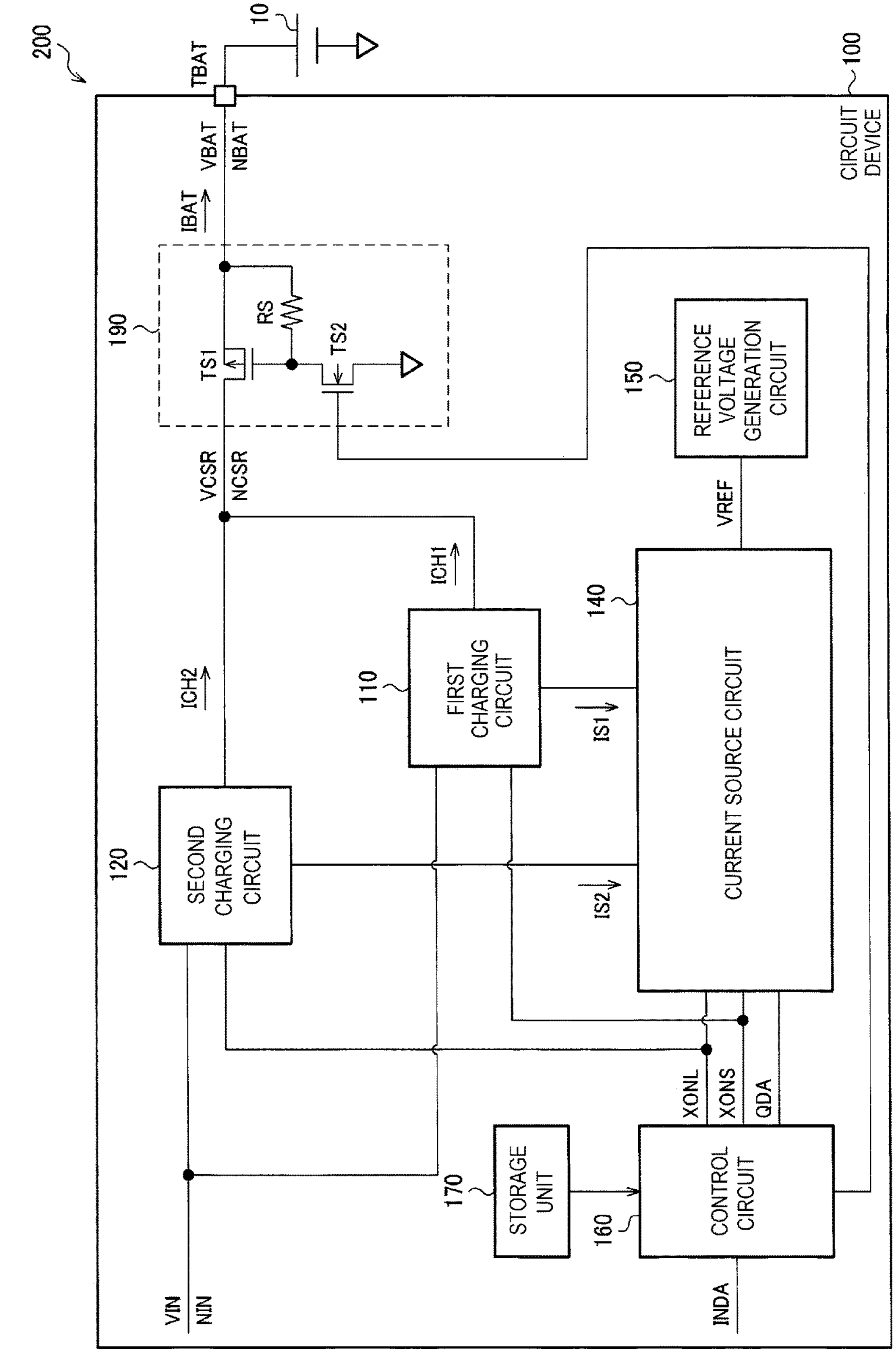
FIG. 1 shows a configuration example of a circuit device and an electronic device according to a first embodiment.

FIG. 1 shows a configuration example of a circuit device 100 and an electronic device 200 including the circuit device 100 according to a first embodiment.

The electronic device 200 includes the circuit device 100 and a battery 10. The battery 10 is a secondary battery, and is, for example, a lithium ion secondary battery, a nickel hydrogen storage battery, or a nickel cadmium storage battery. The electronic device 200 may be any device that incorporates the battery 10 or to which the battery 10 can be attached. Examples of the electronic device 200 include a smartphone, a tablet terminal, a wireless earphone, a wireless hearing aid, a smart watch, a digital camera, and a mobile battery. When the electronic device 200 is a smartphone or the like, the electronic device 200 may include a processing device, a storage device, a wireless communication device, a display device, an operation input device, and the like.

The circuit device 100 charges the battery 10 based on a power supply supplied from outside. The circuit device 100 includes a first charging circuit 110, a second charging circuit 120, a current source circuit 140, a reference voltage generation circuit 150, a control circuit 160, a storage unit 170, a backflow prevention circuit 190, and a terminal TBAT. The circuit device 100 is, for example, an integrated circuit device in which a plurality of circuit elements are integrated on a semiconductor substrate.

The backflow prevention circuit 190 is provided between an output node NCSR of the first charging circuit 110 and the second charging circuit 120 and a charging node NBAT coupled to the terminal TBAT. A terminal of the battery 10 is coupled to the terminal TBAT. When the control circuit 160 turns on the backflow prevention circuit 190, a first charging current ICH1 from the first charging circuit 110 or a second charging current ICH2 from the second charging circuit 120 is supplied as a charging current IBAT to the charging node NBAT. When the charging current IBAT is supplied from the terminal TBAT to the battery 10, the battery 10 is charged.

The backflow prevention circuit 190 includes a P-type transistor TS1, an N-type transistor TS2, and a resistor RS. A source of the P-type transistor TS1 is coupled to the charging node NBAT, and a drain of the P-type transistor TS1 is coupled to the output node NCSR. A source of the N-type transistor TS2 is coupled to a ground node, and a drain of the N-type transistor TS2 is coupled to a gate of the P-type transistor TS1. One end of the resistor RS is coupled to the charging node NBAT, and the other end of the resistor RS is coupled to the gate of the P-type transistor TS1. When the control circuit 160 turns off the N-type transistor TS2, the P-type transistor TS1 is turned off. Since the P-type transistor TS1 includes a parasitic diode using a direction from the output node NCSR to the charging node NBAT as a forward direction, when the P-type transistor TS1 is turned off, the backflow prevention circuit 190 prevents backflow from the battery 10 to the first charging circuit 110 and the second charging circuit 120. When the battery 10 is charged, the control circuit 160 turns on the N-type transistor TS2. Accordingly, the P-type transistor TS1 is turned on. Hereinafter, a charging operation when the P-type transistor TS1 of the backflow prevention circuit 190 is turned on will be mainly described.

The control circuit 160 controls, based on a current setting value INDA indicating a set value of a charging current, the charging such that the battery 10 is charged at a current value indicated by the current setting value INDA. The current setting value INDA may be received from, for example, a processing device provided outside the circuit device 100, or the control circuit 160 may set the current setting value INDA based on a detection result from a detection circuit (not shown) that detects a battery voltage VBAT.

The control circuit 160 switches, based on the current setting value INDA, between a first charging mode in which the first charging circuit 110 charges the battery 10 and a second charging mode in which the second charging circuit 120 charges the battery 10. Specifically, when the current setting value INDA is less than a threshold value, the control circuit 160 activates a first enable signal XONS, and outputs, based on the current setting value INDA, a current source control value QDA of the first current mode to the current source circuit 140. When the current setting value INDA is equal to or greater than the threshold value, the control circuit 160 activates a second enable signal XONL, and outputs, based on the current setting value INDA, the current source control value QDA of the second current mode to the current source circuit 140.

The reference voltage generation circuit 150 generates a reference voltage VREF. The reference voltage generation circuit 150 is, for example, a bandgap reference circuit, and is not limited thereto. The reference voltage VREF may be supplied from outside the circuit device 100.

The current source circuit 140 supplies, based on the reference voltage VREF, an output current set based on the current source control value QDA to the first charging circuit 110 and the second charging circuit 120. Specifically, when the first enable signal XONS is active, the current source circuit 140 supplies a first current IS1 as the output current to the first charging circuit 110. When the second enable signal XONL is active, the current source circuit 140 supplies a second current IS2 as the output current to the second charging circuit 120.

A power supply voltage VIN is supplied to a power supply node NIN. The power supply voltage VIN is supplied from, for example, an external power supply of the circuit device 100. Alternatively, the circuit device 100 may include a power receiving circuit or a voltage conversion circuit (not shown) that receives electric power from the external power supply and outputs the power supply voltage VIN.

When the first enable signal XONS is active, the first charging circuit 110 outputs the first charging current ICH1 to the output node NCSR based on the power supply voltage VIN and the first current IS1. Specifically, the first charging circuit 110 amplifies the first current IS1 with a first gain, and outputs the amplified current as the first charging current ICH1.

When the second enable signal XONL is active, the second charging circuit 120 outputs the second charging current ICH2 to the output node NCSR based on the power supply voltage VIN and the second current IS2. Specifically, the second charging circuit 120 amplifies the second current IS2 with a second gain, and outputs the amplified current as the second charging current ICH2. A current value of the second charging current ICH2 is greater than a current value of the first charging current ICH1. That is, when a threshold value of the charging current IBAT corresponding to a threshold value of the current setting value INDA is Ith, $ICH1 < Ith \leq ICH2$.

FIG. 2 shows an operation explanatory diagram of the control circuit 160 according to the first embodiment.

The control circuit 160 compares the current setting value INDA with a threshold value THR. When the current setting value INDA is less than the threshold value THR, the control circuit 160 determines that the current mode is the first current mode, and outputs a low-level first enable signal XONS and a high-level second enable signal XONL. Here, low active is used. When the current setting value INDA is equal to or greater than the threshold value THR, the control circuit 160 determines that the current mode is the second current mode, and outputs a high-level first enable signal XONS and a low-level second enable signal XONL.

The control circuit 160 performs first correction for obtaining a first setting value STV1=GA1×INDA+OF1 and second correction for obtaining a second setting value STV2=GA2×INDA+OF2. The first setting value STV1 is obtained by adding a first offset correction value OF1 to a product of a first inclination correction value GA1 and the current setting value INDA. The second setting value STV2 is obtained by adding a second offset correction value OF2 to a product of a second inclination correction value GA2 and the current setting value INDA. When the current setting value INDA is less than the threshold value THR, the control circuit 160 outputs the current source control value QDA based on the first setting value STV1. Accordingly, the charging current IBAT=ICH1 in the first charging mode is controlled by the first setting value STV1 corrected by the first correction. When the current setting value INDA is equal to or greater than the threshold value THR, the control circuit 160 outputs the current source control value QDA based on the second setting value STV2. Accordingly, the charging current IBAT=ICH2 in the second charging mode is controlled by the second setting value STV2 corrected by the second correction.

The control circuit 160 may determine that the current mode is the first current mode when the current setting value INDA is equal to or less than the threshold value THR, and may determine that the current mode is the second current mode when the current setting value INDA is greater than the threshold value THR.

The storage unit 170 stores the first inclination correction value GA1 and the first offset correction value OF1, which are correction parameters for the first correction, the second inclination correction value GA2 and the second offset correction value OF2, which are correction parameters for the second correction, and the threshold value THR. The first inclination correction value GA1 and the second inclination correction value GA2 are correction parameters for reducing an inclination difference between a first conversion characteristic from the current setting value INDA to the first charging current ICH1 and a second conversion characteristic from the current setting value INDA to the second charging current ICH2. The first offset correction value OF1 and the second offset correction value OF2 are correction parameters for reducing an offset difference between the first conversion characteristic and the second conversion characteristic. The control circuit 160 performs at least one of the first correction and the second correction using the correction parameters stored in the storage unit 170, thereby reducing at least one of the inclination difference and the offset difference between the first conversion characteristic and the second conversion characteristic. The storage unit 170 is a memory, a register, or the like. The memory is, for example, a nonvolatile memory or a RAM. In addition, the memory may be a combination of a nonvolatile memory and a register, or may be a fuse, an external circuit of the circuit device 100, or the like as long as the memory can store data.

An example in which both inclination correction and offset correction are performed is described above, and only one of the inclination correction and the offset correction may be performed. An example in which at least one of the first correction and the second correction is performed is described above, and both the first correction and the second correction may not be performed. In this case, the first setting value is STV1=INDA, and the second setting value is STV2=INDA.

Figures 3, 4:
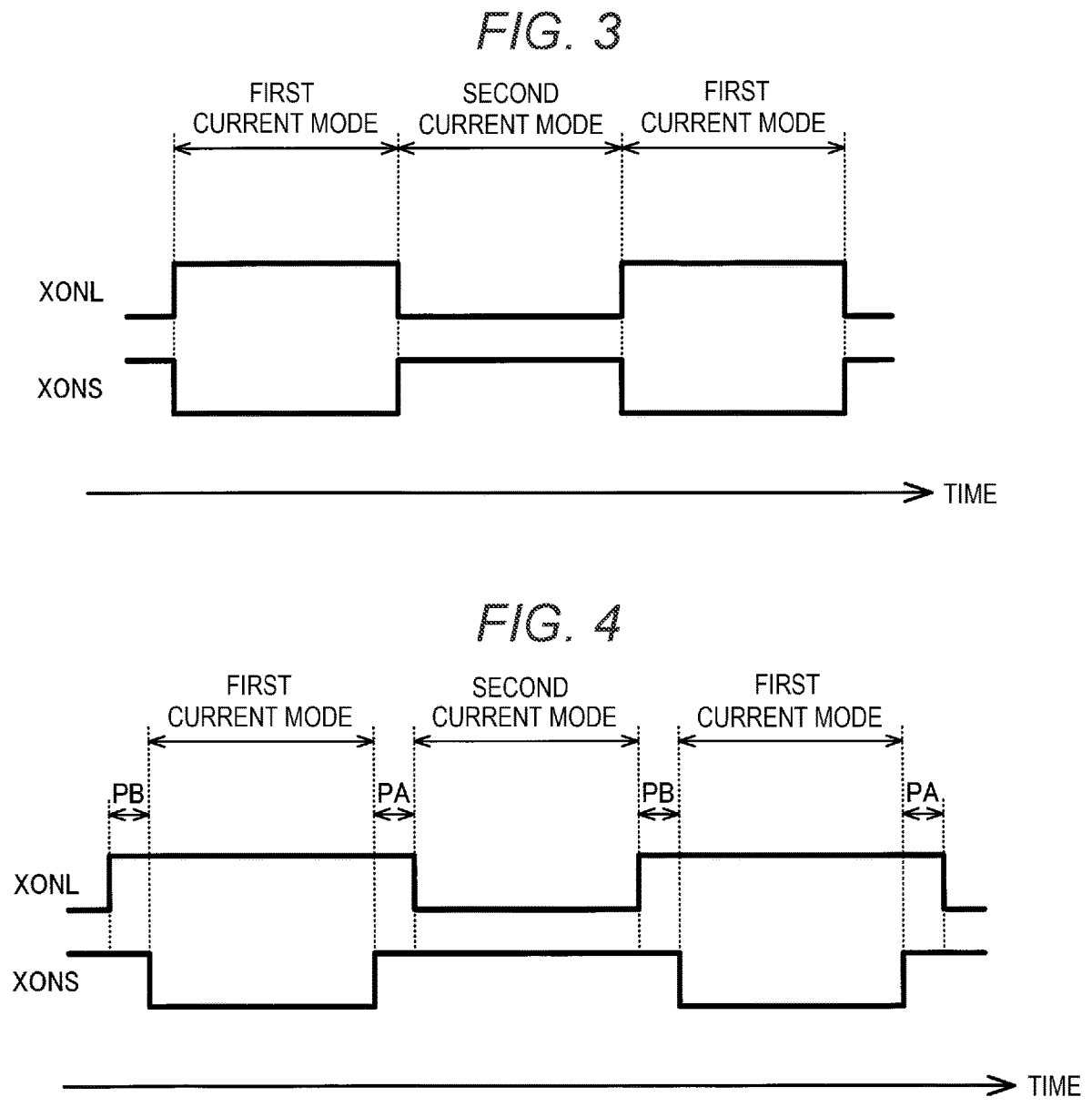

FIG. 3 is a waveform example showing a problem in switching between the first current mode and the second current mode.

In the waveform example of FIG. 3, in the switching from the first current mode to the second current mode, the control circuit 160 changes the second enable signal XONL from a high level to a low level and simultaneously changes the first enable signal XONS from a low level to a high level. In the switching from the second current mode to the first current mode, the control circuit 160 changes the second enable signal XONL from a low level to a high level and simultaneously changes the first enable signal XONS from a high level to a low level. In this case, the charging current IBAT may be an unintended large current due to a slight signal delay difference between the first enable signal XONS and the second enable signal XONL.

For example, in an example described later with reference to FIG. 12 and the like in the first embodiment, a gain of the second charging circuit 120 is eight times a gain of the first charging circuit 110. Further, when the threshold value is set to 256, the second current IS2=62.5 μA in the second current mode when the current setting value INDA is 256 is ⅛ of the second current IS2=0.5 mA in the first current mode when the current setting value INDA is 255. By canceling eight times the gain and ⅛ times the current, a correct second charging current ICH2 is obtained. However, in the switching of the current mode, when a combination in which the gain of a charging circuit is high and the output current of the current source circuit is large occurs due to the signal delay difference between a first charging circuit 110 and second charging circuit 120 side and a current source circuit 140 side, an unintended large charging current IBAT may flow.

Alternatively, a similar problem occurs also in a second embodiment to be described later. In the second embodiment, the current source circuit 140 is divided into a first current source circuit 141 and a second current source circuit 142. Therefore, in the switching of the current mode, when the first enable signal XONS and the second enable signal XONL are simultaneously at a low level due to the signal delay difference, an unintended large charging current IBAT may flow as IBAT=ICH1+ICH2.

FIG. 4 shows a waveform example of the first enable signal XONS and the second enable signal XONL according to the first embodiment. A method in FIG. 4 is also applicable to the second embodiment.

During a switching period of the current mode, the control circuit 160 deactivates both the first enable signal XONS and the second enable signal XONL. Specifically, the control circuit 160 sets XONS=XONL=H during a switching period PA from the first current mode to the second current mode and a switching period PB from the second current mode to the first current mode. A length of the period PA and a length of the period PB are stored in, for example, the storage unit 170 and can be set to any length. As an example, the length of the period PA and the length of the period PB are set to any one of 100 ns, 200 ns, and 300 ns. The length of the period PA and the length of the period PB may be the same as or different from each other, and one of the lengths may be set to be longer than 0 ns and the other may be set to 0 ns.

According to the embodiment, even when the signal delay difference occurs between the first enable signal XONS and the second enable signal XONL, the first charging current ICH1 and the second charging current ICH2 are not supplied to the battery 10 during the switching periods PA and PB. Accordingly, the unintended large charging current IBAT described with reference to FIG. 3 does not flow.

Figure 5:
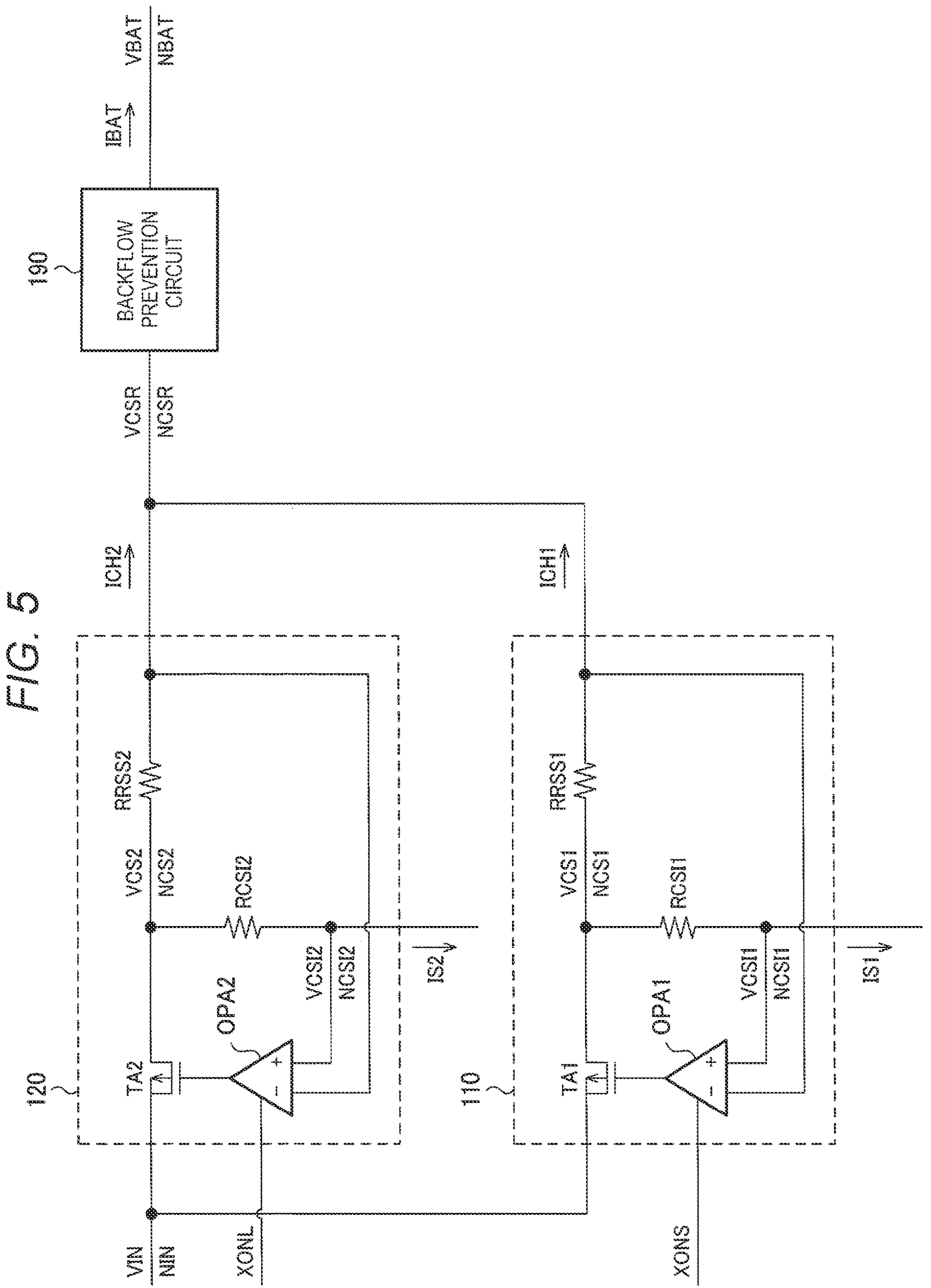
FIG. 5 shows a detailed configuration example of a first charging circuit and a second charging circuit.

Hereinafter, detailed configuration examples and operations of the first charging circuit 110, the second charging circuit 120, and the current source circuit 140 will be described. FIG. 5 shows the detailed configuration example of the first charging circuit 110 and the second charging circuit 120.

The first charging circuit 110 includes an operational amplifier OPA1, a P-type transistor TA1, a resistor RCSI1, and a resistor RRSS1.

A source of the P-type transistor TA1 is coupled to the power supply node NIN, and a drain of the P-type transistor TA1 is coupled to a node NCS1. The power supply voltage VIN is supplied to the power supply node NIN. One end of the resistor RCSI1 is coupled to the node NCS1, and the other end of the resistor RCSI1 is coupled to a node NCSI1. One end of the resistor RRSS1 is coupled to the node NCS1, and the other end of the resistor RRSS1 is coupled to the output node NCSR. A non-inverting input terminal of the operational amplifier OPA1 is coupled to the node NCSI1, an inverting input terminal of the operational amplifier OPA1 is coupled to the output node NCSR, and an output node of the operational amplifier OPA1 is coupled to a gate of the P-type transistor TA1.

The operational amplifier OPA1 is operationally enabled when the first enable signal XONS is active. Accordingly, the first charging current ICH1={(RCSI1/RRSS1)×IS1} is supplied to the output node NCSR and supplied as the charging current IBAT to the charging node NBAT.

The second charging circuit 120 includes an operational amplifier OPA2, a P-type transistor TA2, a resistor RCSI2, and a resistor RRSS2.

A source of the P-type transistor TA2 is coupled to the power supply node NIN, and a drain of the P-type transistor TA2 is coupled to a node NCS2. One end of the resistor RCSI2 is coupled to the node NCS2, and the other end of the resistor RCSI2 is coupled to a node NCSI2. One end of the resistor RRSS2 is coupled to the node NCS2, and the other end of the resistor RRSS2 is coupled to the output node NCSR. A non-inverting input terminal of the operational amplifier OPA2 is coupled to the node NCSI2, an inverting input terminal of the operational amplifier OPA2 is coupled to the output node NCSR, and an output node of the operational amplifier OPA2 is coupled to a gate of the P-type transistor TA2.

The operational amplifier OPA2 is operationally enabled when the second enable signal XONL is active. Accordingly, the second charging current ICH2=(RCSI2/RRSS2)×IS2 is supplied to the output node NCSR and supplied as the charging current IBAT to the charging node NBAT.

Figure 6:
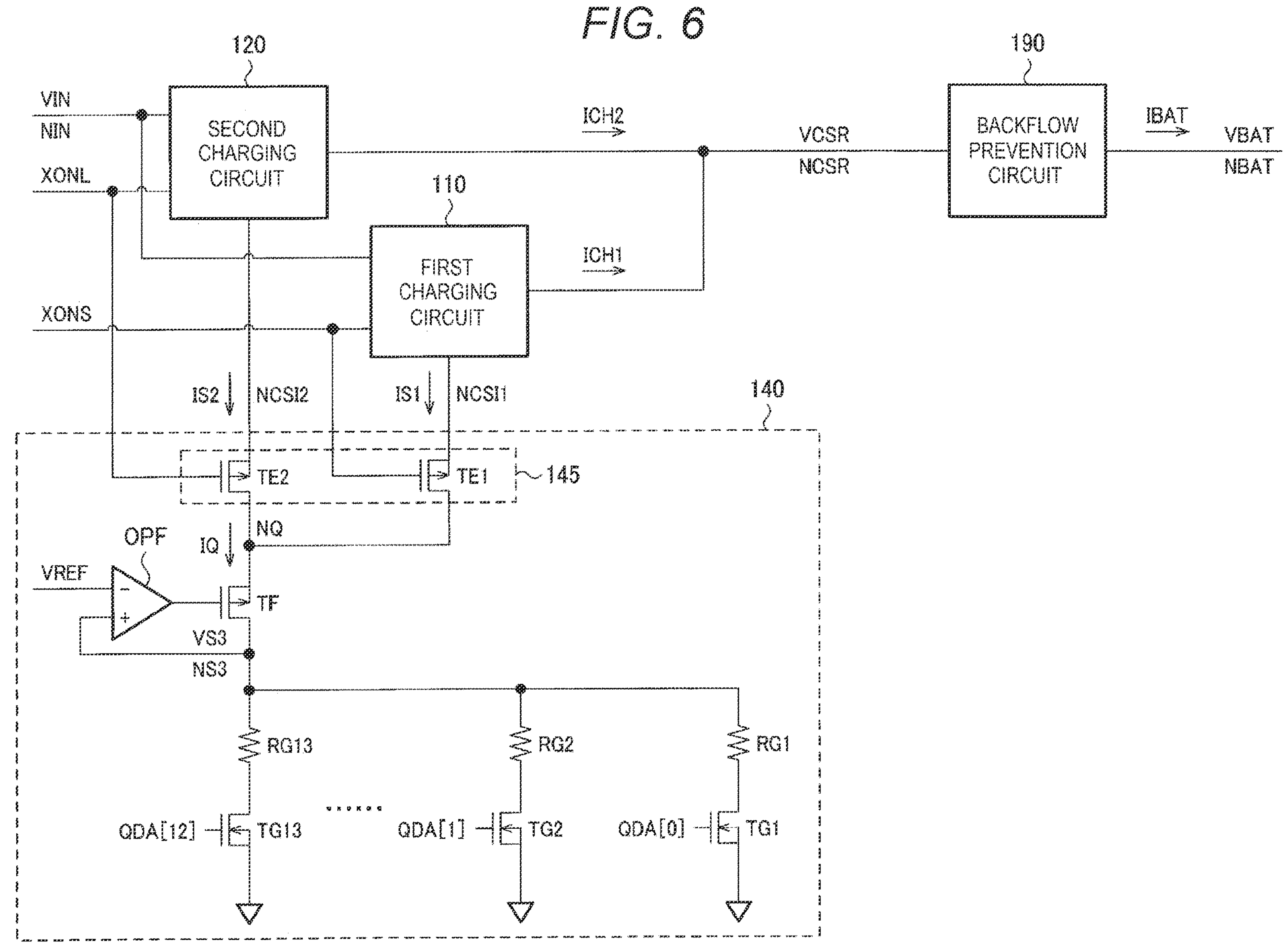
FIG. 6 shows a detailed configuration example of a current source circuit according to the first embodiment.

FIG. 6 is the detailed configuration example of the current source circuit 140 according to the first embodiment. The current source circuit 140 includes an operational amplifier OPF, a switch circuit 145, a P-type transistor TF, resistors RG1 to RG13, and N-type transistors TG1 to TG13.

The switch circuit 145 includes a first transistor TE1 and a second transistor TE2. The first transistor TE1 and the second transistor TE2 are, for example, P-type transistors. A source of the first transistor TE1 is coupled to the node NCSI1, and a drain of the first transistor TE1 is coupled to a node NQ. A source of the second transistor TE2 is coupled to the node NCSI2, and a drain of the second transistor TE2 is coupled to the node NQ. When the first enable signal XONS is at a low level, the first transistor TE1 is turned on, and a current IQ flowing through the P-type transistor TF flows as the first current IS1 to the node NCSI1. When the second enable signal XONL is at a low level, the second transistor TE2 is turned on, and the current IQ flowing through the P-type transistor TF flows as the second current IS2 to the node NCSI2.

A source of the P-type transistor TF is coupled to the node NQ, and a drain of the P-type transistor TF is coupled to a node NS3. The reference voltage VREF is input to an inverting input terminal of the operational amplifier OPF. A non-inverting input terminal of the operational amplifier OPF is coupled to the node NS3, and an output node of the operational amplifier OPF is coupled to a gate of the P-type transistor TF. One end of the resistor RG1 is coupled to the node NS3, and the other end of the resistor RG1 is coupled to a drain of the N-type transistor TG1. A source of the N-type transistor TG1 is coupled to a ground node. Similarly, one end of each of the resistors RG2 to RG13 is coupled to the node NS3, and the other end of each of the resistors RG2 to RG13 is coupled to a drain of each of the N-type transistors TG2 to TG13. A source of each of the N-type transistors TG2 to TG13 is coupled to the ground node. Hereinafter, a bit signal of the current source control value QDA is referred to as a control bit signal. A control bit signal QDA[0] of the current source control value QDA is input to a gate of the N-type transistor TG1. Similarly, control bit signals QDA[1] to QDA[12] of the current source control value QDA are input to gates of the N-type transistors TG2 to TG13.

The operational amplifier OPF is operationally enabled in both the first current mode and the second current mode, and a voltage of the node NS3 is VS3=VREF. The resistor RG1 and the N-type transistor TG1 are referred to as a first current source of the current source circuit 140. When the control bit signal QDA[0] of the current source control value QDA is 1, the N-type transistor TG1 is turned on, and the first current source causes a current of VREF/RG1 to flow. Similarly, the resistors RG2 to RG13 and the N-type transistors TG2 to TG13 are referred to as second to thirteenth current sources of the current source circuit 140. When the control bit signals QDA[1] to QDA[12] of the current source control value QDA are 1, the N-type transistors TG2 to TG13 are turned on, and the second to thirteenth current sources cause currents of VREF/RG2 to VREF/RG13 to flow. The current IQ flowing through the P-type transistor TF is a sum of the currents flowing from the current sources corresponding to the control bit signal which is 1 among the control bit signals QDA[0] to QDA[12] of the current source control value QDA.

Here, the number of current sources included in the current source circuit 140 is 13, and the number of current sources included in the current source circuit 140 may be n. n is an integer of 2 or more.

Figure 7:
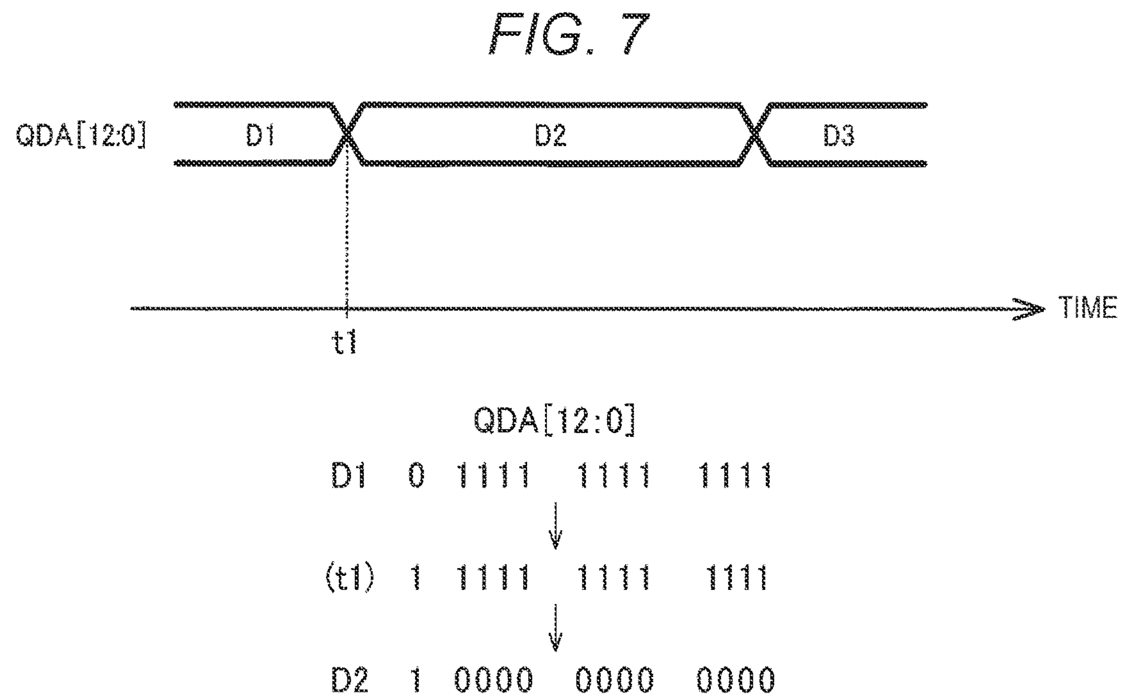
FIG. 7 is a waveform example showing a problem that occurs when a current source control value changes.

FIG. 7 is a waveform example showing a problem that occurs when the current source control value QDA changes. As shown in FIG. 7, the control circuit 160 changes the current source control value QDA from D1 to D2 and from D2 to D3. The change in the current source control value QDA may be any of a change in QDA in the first current mode, a change in QDA in the second current mode, a change in QDA in the switching from the first current mode to the second current mode, or a change in QDA in the switching from the second current mode to the first current mode.

Hereinafter, the change from D1 to D2 will be described as an example. The control circuit 160 changes the current source control value QDA from D1 to D2 at a timing t1. For example, D1=0 1111 1111 1111b and D2=1 0000 0000 0000b. At this time, an unintended current source control value QDA may occur at the timing t1 due to a slight signal delay difference between control bit signals. For example, when the control bit signal QDA[11:0] is slightly delayed with respect to the control bit signal QDA[12], a state is equivalent to QDA[12:0]=1 1111 1111 1111b at the timing t1. As a result, the current source circuit 140 outputs a current approximately twice the expected one, and an unintended large charging current IBAT may flow.

Values of D1 and D2 shown in FIG. 7 are merely examples, and D1 to D3 may be any values. Similarly, in FIGS. 8 and 9, D1 to D3 may be any values.

Figure 8:
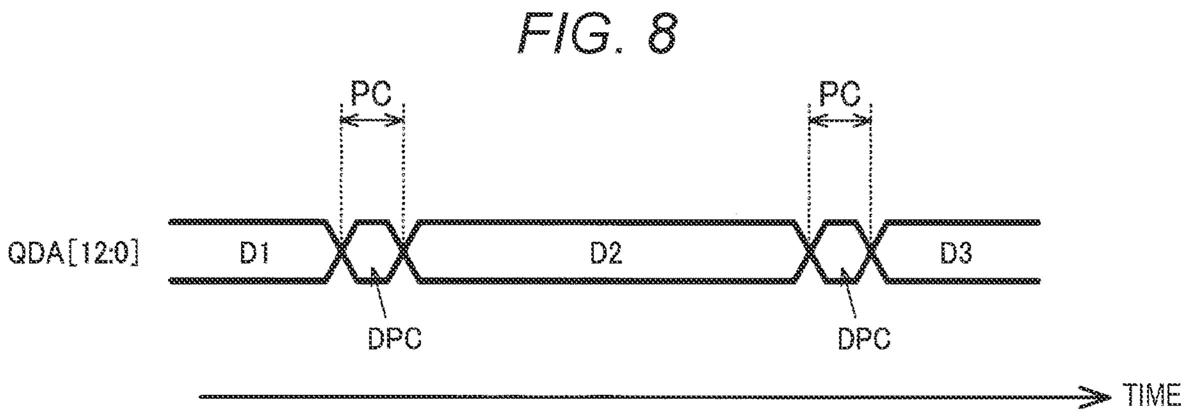
FIG. 8 shows a first waveform example of the current source control value according to the first embodiment.

FIG. 8 shows a first waveform example of the current source control value QDA according to the first embodiment. The control circuit 160 sets the current source control value QDA to a predetermined value DPC such that the output current of the current source circuit 140 is zero or is reduced during a switching period PC. In FIG. 8, the switching period PC is a period between a period in which QDA=D1 is output and a period in which QDA=D2 is output by the control circuit 160, and a period between a period in which QDA=D2 is output and a period in which QDA=D3 is output by the control circuit 160.

A length of the period PC is stored in, for example, the storage unit 170 and can be set to any length. The length of the period PC is stored in, for example, the storage unit 170, and is set to, for example, any one of 100 ns, 200 ns, and 300 ns.

Hereinafter, the switching period PC between the period for outputting QDA=D1 and the period for outputting QDA=D2 will be described as an example. FIG. 8 shows an example in which the output current of the current source circuit 140 is zero during the switching period PC. For example, D1=0 1111 1111 1111b and D2=1 0000 0000 0000b. The control circuit 160 sets the current source control value QDA to zero during the switching period PC, that is, outputs QDA=DPC=0 0000 0000 0000b. Accordingly, the N-type transistors TG1 to TG13 in FIG. 6 are all turned off, the first to thirteenth current sources are non-output, and the first current IS1 and the second current IS2 are not output, so that the first charging current ICH1 and the second charging current ICH2 are not supplied to the battery 10. Accordingly, even when the signal delay difference occurs between the control bit signals, the unintended large charging current IBAT described with reference to FIG. 7 does not flow.

Figure 9:
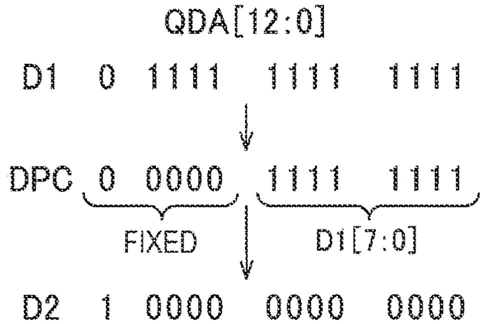
FIG. 9 shows a second waveform example of the current source control value according to the first embodiment.

FIG. 9 shows a second waveform example of the current source control value QDA according to the first embodiment. FIG. 9 shows an example in which the output current of the current source circuit 140 is reduced during the switching period PC. During the switching period PC, the control circuit 160 sets upper 5 bits QDA[12:8] of the current source control value QDA to zero and the lower 8 bits QDA[7:0] to D1[7:0]. Accordingly, among the N-type transistors TG1 to TG13 in FIG. 6, the transistors TG9 to TG13 are turned off, and the ninth to thirteenth current sources among the first to thirteenth current sources are non-output. Since DPC≤D1, the output current of the current source circuit 140 when QDA=DPC is equal to or less than the output current when QDA=D1. That is, during the switching period PC, the output current of the current source circuit 140 is reduced. Accordingly, since the charging current IBAT is reduced during the switching period PC, even when the signal delay difference between the control bit signals occurs, the unintended large charging current IBAT described with reference to FIG. 7 does not flow.

FIGS. 8 and 9 show an example in which the upper 5 bits of DPC are set to zero and the ninth to thirteenth current sources are non-output, and the present disclosure is not limited thereto. Upper (n−p+1) bit of DPC may be set to zero, and p-th to n-th current sources among the first to n-th current sources may be non-output. p may be an integer of 2 or more and n or less. FIGS. 8 and 9 are examples when n=13 and p=9.

Figure 10:
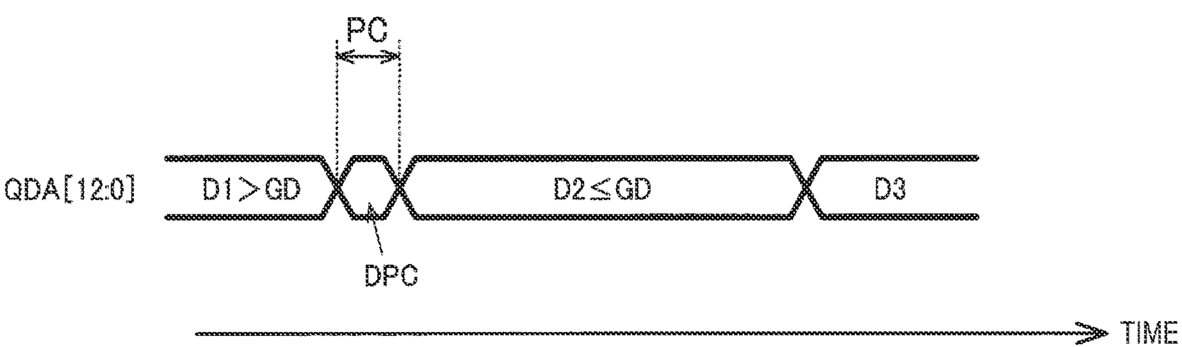
FIG. 10 shows a third waveform example of the current source control value according to the first embodiment.

FIG. 10 shows a third waveform example of the current source control value QDA according to the first embodiment. When the current source control value QDA is less than a threshold value GD, the control circuit 160 does not provide the switching period PC when changing the current source control value QDA.

For example, D1≥GD and D2<GD. The control circuit 160 provides the switching period PC when changing the current source control value QDA from D1 to D2, and sets the current source control value QDA to the predetermined value DPC during the switching period PC. Any of the predetermined values DPC described in FIG. 8 or 9 may be set. When changing the current source control value QDA from D2 to D3, the control circuit 160 switches the current source control value QDA directly from D2 to D3 without providing the switching period PC. When the current source control value QDA is equal to or less than the threshold value GD, it is expected that the unintended charging current IBAT described with reference to FIG. 7 does not become so large. Therefore, by providing the switching period PC only when the current source control value QDA is greater than the threshold value GD, the unintended large charging current IBAT may not flow. Here, although D1≥GD and D2<GD, D1>GD and D2≤GD may be satisfied.

The threshold value GD may be any value greater than zero and less than a maximum value of the current source control value QDA. For example, in FIG. 9, the maximum value of DPC is 255, and the threshold value GD may be set to the same value of 255. The storage unit 170 may store the threshold value GD. The threshold value GD may be the same as or different from the threshold value THR.

FIG. 11 is a diagram showing resistance ratios and operations of the current source circuit 140 according to the first embodiment.

A resistance ratio of the resistors RG1 to RG13 for determining a current ratio of the first to thirteenth current sources is RG13:RG12: . . . :RG2:RG1=0.25:0.5: . . . :512:1024. Since a reciprocal ratio thereof is the current ratio, the current flowing from the first to thirteenth current sources is weighted in binary.

The control circuit 160 corrects the current setting value INDA to obtain the first setting value STV1 and the second setting value STV2. At this time, the first setting value STV1 and the second setting value STV2 are calculated with accuracy higher than an LSB of the current setting value INDA. For example, when the current setting value INDA is 13-bit INDA[12:0], the first setting value STV1 is calculated as 18-bit STV1[17:0], and the second setting value STV2 is calculated as 21-bit STV2[20:0]. At this time, a bit corresponding to INDA[0] which is the LSB of the current setting value is STV1[8] in STV1[17:0] and STV2[8] in STV2[20:0].

In a case of the first current mode, that is, when the first enable signal XONS is at a low level, the control circuit 160 assigns upper 13 bits of STV1[17:0] to the current source control value QDA, and outputs QDA[12:0]=STV1[17:5] to the current source circuit 140. In a case of the second current mode, that is, when the second enable signal XONL is at a low level, the control circuit 160 assigns upper 13 bits of STV2[20:0] to the current source control value QDA, and outputs QDA[12:0]=STV2[20:8] to the current source circuit 140. In QDA[12:0], the bit corresponding to INDA[0] which is the LSB of the current setting value is QDA[3] in the first current mode and QDA[0] in the second current mode. That is, a resolution of the first current IS1 corresponding to the LSB of the current setting value and a resolution of the second current IS2 corresponding to the LSB of the current setting value INDA are different. Since the difference is absorbed by a difference between the first gain of the first charging circuit 110 and the second gain of the second charging circuit 120, the resolution of the first charging current ICH1 corresponding to the LSB of the current setting value INDA and the resolution of the second charging current ICH2 corresponding to the LSB of the current setting value INDA are substantially equal. This point will also be described in FIG. 12.

Here, an example is shown in which the first setting value STV1 and the second setting value STV2, which are extended to a lower side by 8 bits with respect to the current setting value INDA, are calculated. However, the number of bits for the extension may be freely set as long as accuracy required for the calculation can be ensured. Here, an example is shown in which the assignment from the first setting value STV1 to the current source control value QDA and the assignment from the second setting value STV2 to the current source control value QDA are shifted by three bits. However, the number of bits for the shift may be freely set within a range in which the first charging current ICH1 and the second charging current ICH2 can have the same resolution according to a relationship between the first gain and the second gain.

A left part of FIG. 12 is a parameter example of the first charging circuit 110 and the current source circuit 140 in the first current mode. A right part of FIG. 12 is a parameter example of the second charging circuit 120 and the current source circuit 140 in the second current mode. The right part of FIG. 12 also shows a relationship with the parameters in the left part. FIG. 12 shows an ideal parameter example, that is, a parameter example when ideal characteristics of the first charging current and the second charging current can be obtained even when the correction is not performed.

The reference voltage is set to VREF=1.25 V, a unit resistance of the resistors RG1 to RG13 is set to 5 kΩ, and the threshold value for switching the current mode is set to 256. In the following description, numerical values are rounded off as appropriate.

As shown in the left part, a resistance of the fourth current source corresponding to the LSB of the current setting value INDA in the first current mode is RG4=5 kΩ×128. Therefore, the resolution of the first current IS1 corresponding to the LSB of the current setting value INDA is VREF/RG4=1.95 μA. A maximum value IS1max of the first current is IS1 resolution×255=0.5 mA. When RRSS1=32Ω and RCSI1=700Ω, the first gain is RCSI1/RRSS1=21.9 times. The resolution of the first charging current ICH1 is ((IS1 resolution)×(first gain))=42.7 μA, and a maximum value ICH1max of the first charging current is ((IS1max×first gain))=10.9 mA. A minimum potential difference between both ends of the resistor RCSI1 becomes RCSI1×(IS1 resolution)=1.37 mV.

As shown in the right part, a resistance of the first current source corresponding to the LSB of the current setting value INDA in the second current mode is RG1=5 kΩ×1024. Therefore, the resolution of the second current IS2 corresponding to the LSB of the current setting value INDA becomes VREF/RG1=0.244 μA. When QDA[12:0]=0 0001 0000 0000b, the second current takes a minimum value IS2min=(IS2 resolution)×256=62.5 μA. A maximum value IS2max of the second current is (IS2 resolution)×8191=2 mA. When the RRSS2=1Ω and the RCSI2=175Ω, the second gain is RCSI2/RRSS2=175 times. The resolution of the second charging current ICH2 becomes (IS2 resolution)×(second gain)=42.7 μA, and the maximum value ICH2max of the second charging current becomes IS2max×(second gain)=350 mA. A minimum potential difference between both ends of the resistor RCSI2 becomes RCSI2×IS2min=10.9 mV. The relationship with the parameters in the left part is as shown.

A minimum value of the second charging current ICH2 is as follows.

$$IS2\min\times(\text{second gain})=$$
$$\{((IS1\ \text{resolution})/8)\times 256\}\times((\text{first gain})\times 8)=(IS1\ \text{resolution})\times$$
$$256\times(\text{first gain})=IS1\max+(IS1\ \text{resolution})\times(\text{first gain})$$

IS1max×(first gain) is a maximum value of the first charging current ICH1, and (IS1 resolution)×(first gain) is the ICH1 resolution. Further, the ICH1 resolution=the ICH2 resolution. That is, a value obtained by increasing the maximum value of the ICH1 by the ICH2 resolution is the minimum value of the ICH2. That is, even before and after the switching between the ICH1 and the ICH2, ideally, the charging current IBAT is linear with respect to the current setting value INDA[12:0].

However, since the actually manufactured circuit does not have ideal characteristics due to various factors, an offset difference or an inclination difference occurs between the first charging current ICH1 and the second charging current ICH2. According to the embodiment, a characteristic difference between the first charging current ICH1 and the second charging current ICH2 can be reduced by performing at least one of the first correction and the second correction described in FIG. 2 and the like.

In the embodiment described above, the circuit device 100 includes the current source circuit 140, the first charging circuit 110, the second charging circuit 120, and the control circuit 160. The first charging circuit 110 supplies, based on the output current of the current source circuit 140, the first charging current ICH1, which is a constant current, as the charging current IBAT to the charging node NBAT. The second charging circuit 120 supplies, based on the output current of the current source circuit 140, the second charging current ICH2, which is a constant current greater than the first charging current ICH1, as the charging current IBAT to the charging node NBAT. The control circuit 160 controls, when the current setting value INDA is in a first current range, the first current mode in which the first charging current ICH1 having a current value indicated by the current setting value INDA is supplied from the first charging circuit 110 to the charging node NBAT. The control circuit 160 controls, when the current setting value INDA is in a second current range on a current side higher than the first current range, the second current mode in which the second charging current ICH2 having a current value indicated by the current setting value INDA is supplied from the second charging circuit 120 to the charging node NBAT.

According to the embodiment, when the current setting value INDA is in the second current range, the second charging circuit 120 is switched to perform the charging with the second charging current ICH2 greater than the first charging current ICH1. Accordingly, a large charging current is implemented. Further, by switching between the first charging circuit 110 and the second charging circuit 120 according to the current setting value INDA of the charging current IBAT, an optimal constant current charging circuit can be designed according to the current value of the charging current IBAT. Accordingly, an increase in a circuit scale, a decrease in the resolution of the charging current, or a decrease in power efficiency can be prevented while implementing a large charging current.

In the embodiment, as described with reference to FIG. 4, the control circuit 160 sets both the first charging current ICH1 and the second charging current ICH2 to a non-supply state during the switching periods PA and PB between the first current mode and the second current mode.

Since the first current mode and the second current mode are switched by switching the first charging circuit 110 and the second charging circuit 120, the charging current IBAT may be an unintended large current at the time of the switching. According to the embodiment, since both the first charging current ICH1 and the second charging current ICH2 are in the non-supply state during the switching periods PA and PB, the charging current IBAT does not become the unintended large current.

In the embodiment, the control circuit 160 outputs the first enable signal XONS for controlling the first charging current ICH1 to a supply state or a non-supply state and the second enable signal XONL for controlling the second charging current ICH2 to a supply state or a non-supply state. During the switching periods PA and PB, the control circuit 160 sets both the first charging current ICH1 and the second charging current ICH2 to the non-supply state by deactivating the first enable signal XONS and the second enable signal XONL.

As described in FIG. 3, in the switching between the first current mode and the second current mode, the charging current IBAT may be an unintended large current due to a slight signal delay difference between the first enable signal XONS and the second enable signal XONL. According to the embodiment, the first enable signal XONS and the second enable signal XONL are set to be deactivated during the switching periods PA and PB. Accordingly, since both the first charging current ICH1 and the second charging current ICH2 are in the non-supply state, the charging current IBAT does not become the unintended large current.

In the embodiment, the first charging circuit 110 is controlled to be enabled or disabled based on the first enable signal XONS, and supplies the first charging current ICH1 to the charging node NBAT when enabled. The second charging circuit 120 is controlled to be enabled or disabled based on the second enable signal XONL, and supplies the second charging current ICH2 to the charging node NBAT when enabled. During the switching periods PA and PB, the control circuit 160 disables the first charging circuit 110 and the second charging circuit 120 by deactivating the first enable signal XONS and the second enable signal XONL.

According to the embodiment, during the switching periods PA and PB, since the first charging circuit 110 and the second charging circuit 120 are disabled, both the first charging current ICH1 and the second charging current ICH2 are in the non-supply state.

In the embodiment, the circuit device 100 includes the first transistor TE1 and the second transistor TE2. The first transistor TE1 is controlled to be turned on or off based on the first enable signal XONS, and supplies the output current from the current source circuit 140 to the first charging circuit 110 when turned on. The second transistor TE2 is controlled to be turned on or off based on the second enable signal XONL, and supplies the output current from the current source circuit 140 to the second charging circuit 120 when turned on. During the switching periods PA and PB, the control circuit 160 turns off the first transistor TE1 and the second transistor TE2 by deactivating the first enable signal XONS and the second enable signal XONL.

According to the embodiment, during the switching periods PA and PB, since the first transistor TE1 and the second transistor TE2 are turned off, no current is supplied from the current source circuit 140 to the first charging circuit 110 and the second charging circuit 120. Accordingly, both the first charging current ICH1 and the second charging current ICH2 are in the non-supply state.

In the embodiment, as described with reference to FIG. 8 or 9, the control circuit 160 sets the current source control value QDA such that the output current of the current source circuit 140 is zero or is reduced during the switching period PC of the current source control value QDA.

As described in FIG. 7, when the current source control value QDA changes, an unintended large charging current IBAT may flow due to a signal delay difference between the control bit signals of the current source control value QDA. According to the embodiment, since the output current of the current source circuit 140 is zero or is reduced during the switching period PC of the current source control value QDA, the unintended large charging current IBAT does not flow.

The expression "the output current of the current source circuit 140 is reduced" means that the current output by the current source circuit 140 based on the current source control value QDA set during the switching period PC is less than the current output by the current source circuit 140 based on the current source control value QDA immediately before the switching period PC.

In the embodiment, when the current source control value QDA is greater than the threshold value GD, the control circuit 160 sets the current source control value QDA such that the output current of the current source circuit 140 is zero or is reduced during the switching period PC.

When the current source control value QDA is less than the threshold value GD, it is expected that the unintended charging current IBAT does not become so large. Therefore, only when the current source control value QDA is equal to or greater than the threshold value GD, the current source control value QDA may be set such that the output current of the current source circuit 140 is zero or is reduced during the switching period PC. When the current source control value QDA is equal to or greater than the threshold value GD, the control circuit 160 may set the current source control value QDA such that the output current of the current source circuit 140 is zero or is reduced during the switching period PC.

In the embodiment, in the first current mode, the current source circuit 140 supplies, as the output current to the first charging circuit 110, the first current IS1 having the current value indicated by the current source control value QDA. The first charging circuit 110 supplies the first charging current ICH1 by amplifying the first current IS1 with the first gain. In the second current mode, the current source circuit 140 supplies, as the output current to the second charging circuit 120, the second current IS2 having the current value indicated by the current source control value QDA. The second charging circuit 120 supplies the second charging current ICH2 by amplifying the second current IS2 with the second gain greater than the first gain.

According to the embodiment, since the second gain in the second current mode is greater than the first gain in the first current mode, the second charging current greater than the first charging current can be generated in the second current mode. Further, as shown in FIG. 12, (ICH1 resolution)=(ICH2 resolution) is true, (ICH1 resolution)=(IS1 resolution)×(first gain) is true, and (RCSI1 minimum potential difference)=RCSI1×(IS1 resolution) is true. Since the first gain is smaller than the second gain, the IS1 resolution can be increased, and thus the RCSI1 minimum potential difference can be increased. Accordingly, the first charging current ICH1 can be realized to have a higher-accuracy resolution. Although the IS2 resolution is smaller than the IS1 resolution, the RCSI2 minimum potential difference=RCSI2×IS2min is obtained by separating the first charging circuit 110 and the second charging circuit 120. Accordingly, a value of the resolution of the second charging current ICH2 is a value same as the resolution of the first charging current ICH1, and the first charging current ICH1 and the second charging current ICH2 can be realized to have a higher-accuracy resolution.

In the embodiment, the current source circuit 140 includes first to n-th current sources. The first to n-th current sources has current values weighted in binary, and output or non-output of first to n-th constant currents is controlled based on the current source control value QDA. During the switching period PC of the current source control value QDA, the control circuit 160 sets the current source control value QDA at which the first to n-th constant currents are not output, or sets the current source control value QDA at which p-th to n-th constant currents on a high-current side among the first to n-th constant currents are not output.

In the examples of FIGS. 6, 9, 11, and 12, n=13 and p=9, n may be an integer of 2 or more, and p may be an integer of 2 or more and n or less.

According to the embodiment, during the switching period PC of the current source control value QDA, since the first to n-th constant currents are not output, the output current of the current source circuit 140 is zero. Alternatively, during the switching period PC of the current source control value QDA, since the p-th to n-th constant currents on the high-current side among the first to n-th constant currents are not output, the output current of the current source circuit 140 is reduced.

In the embodiment, the control circuit 160 outputs first to n-th control bit signals QDA[0] to QDA[n−1] of the current source control value QDA for controlling the first to n-th current sources based on the current setting value INDA. The current source circuit 140 includes the first transistor TE1 and the second transistor TE2. In the first current mode, the first transistor TE1 supplies, as the first current IS1 to the first charging circuit 110, a current from a current source selected, based on the first to n-th control bit signals QDA[0] to QDA[n−1], from the first to n-th current sources. In the second current mode, the second transistor TE2 supplies, as the second current IS2 to the second charging circuit 120, a current from a current source selected, based on the first to n-th control bit signals QDA[0] to QDA[n−1], from the first to n-th current sources.

In the examples of FIGS. 6, 11, and 12, n=13, and n may be an integer of 2 or more.

According to the embodiment, the first to n-th control bit signals QDA[0] to QDA[n−1] are output based on the current setting value INDA, and the output or the non-output of the first to n-th current sources is controlled based on the first to n-th control bit signals QDA[0] to QDA[n−1]. Accordingly, in the first current mode, the first transistor TE1 outputs the current from the first to n-th current sources to the first charging circuit 110, and therefore, the first charging circuit 110 supplies the first charging current ICH1 having the current value indicated by the current setting value INDA. In the second current mode, the second transistor TE2 outputs the current from the first to n-th current sources to the second charging circuit 120, and therefore, the second charging circuit 120 supplies the second charging current ICH2 having the current value indicated by the current setting value INDA.

In the embodiment, the control circuit 160 sets, based on the current setting value INDA, the first setting value STV1 for setting a current value of the first charging current ICH1 and the second setting value STV2 for setting a current value of the second charging current ICH2. In the second current mode, the control circuit 160 outputs (i+1)-th to (i+n)-th bit signals STV2[*i*] to STV2[*i*+*n*−1] among bit signals of the second setting value STV2 as the first to n-th control bit signals QDA[0] to QDA[n−1]. In the first current mode, the control circuit 160 outputs (i+1−k)-th to (i−k+n)-th bit signals STV1[*i*−*k*] to STV1[*i*−*k*+*n*−1] among bit signals of the first setting value STV1 as the first to n-th control bit signals QDA[0] to QDA[n−1].

In the examples of FIGS. 6, 11, and 12, n=13, i=8, and k=3, n may be an integer of 2 or more, i may be an integer of 1 or more, and k may be an integer of 1 or more and i or less. The current source circuit 140 includes n current sources having current values weighted in binary. The (n-k) current sources with the highest weight among the n current sources correspond to a current source control value QDA [n−1:k] in the first current mode. In FIG. 11, for example, the number of current sources corresponding to QDA[12:3] is 10. This is because the bit corresponding to INDA[0] which is the LSB of the current setting value is QDA[3]. The current source may be deactivated regardless of the bit such that the current source corresponding to QDA[k−1:0] at a lower bit than the LSB of the current setting value does not operate, or may be activated regardless of the bit. Further, QDA[k−1:0] may be supplied to the current source at the lower bit than the LSB of the current setting value for control. In FIG. 11, QDA[k−1:0] is QDA[2:0].

According to the embodiment, as shown in FIGS. 11 and 12, the resolution of the first current IS1 corresponding to the LSB of the current setting value INDA and the resolution of the second current IS2 corresponding to the LSB of the current setting value INDA are different. In the embodiment, since a difference in the resolution can be absorbed by a difference between the first gain of the first charging circuit 110 and the second gain of the second charging circuit 120, the resolution of the first charging current ICH1 corresponding to the LSB of the current setting value INDA and the resolution of the second charging current ICH2 corresponding to the LSB of the current setting value INDA can be set substantially equal.

In addition, according to the embodiment, as shown in FIG. 12, since the first gain is smaller than the second gain, the resolution of the first current IS1 can be made greater than the resolution of the second current IS2. The difference in the resolution is implemented by bit assignment from the second setting value STV2 to the current source control value QDA and bit assignment from the first setting value STV1 to the current source control value QDA being different by k bits. Since a minimum potential difference of the resistor RCSI1 related to the first gain can be increased by increasing the resolution of the first current IS1, a sufficiently large potential difference can be ensured for the operational amplifier OPF to amplify with a highly accurate gain. Accordingly, the first charging current ICH1 and the second charging current ICH2 can be realized to have a higher-accuracy resolution.

2. Second Embodiment

Figure 13:
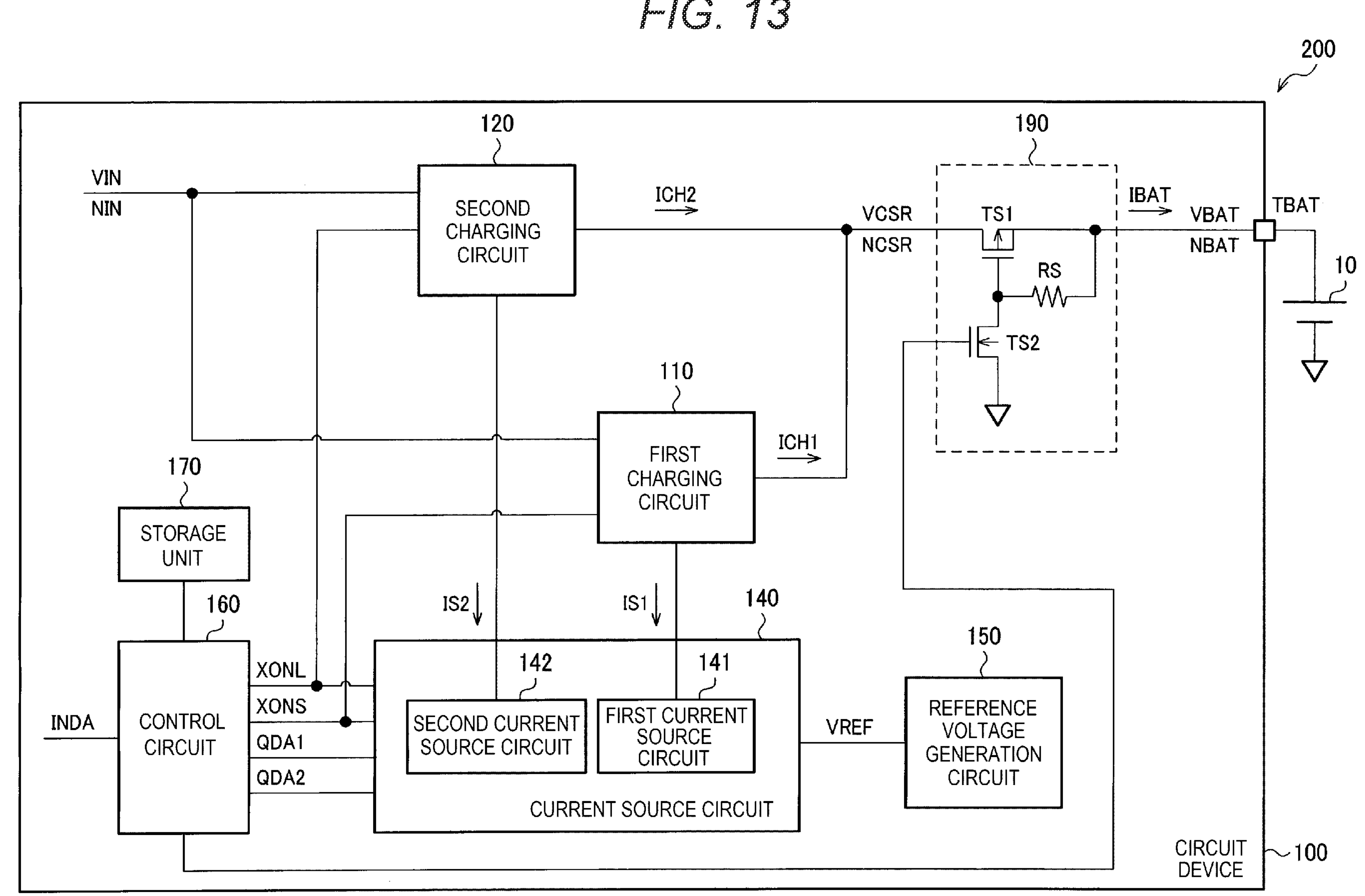
FIG. 13 shows a configuration example of a circuit device and an electronic device according to a second embodiment.

FIG. 13 shows a configuration example of the circuit device 100 and the electronic device 200 including the circuit device 100 according to the second embodiment. The second embodiment is different from the first embodiment in a configuration of the current source circuit 140. In the description of FIG. 1, the control circuit 160 outputs the current source control value QDA to the current source circuit 140, whereas the embodiment differs in that the control circuit 160 outputs a first current source control value QDA1 and a second current source control value QDA2 to the current source circuit 140. A method of providing the switching periods PA and PB of the current mode described with reference to FIG. 4 is the same as that of the first embodiment. The same components as those described above are denoted by the same reference numerals, and the description thereof will be appropriately omitted.

The control circuit 160 performs first correction for the current setting value INDA, and outputs a result of the correction as the first current source control value QDA1 to the current source circuit 140. Further, the control circuit 160 performs second correction for the current setting value INDA, and outputs a result of the correction as the second current source control value QDA2 to the current source circuit 140. The methods of the first correction and the second correction are the same as those of the first embodiment.

The current source circuit 140 includes the first current source circuit 141 and the second current source circuit 142. The first current source circuit 141 generates the first current IS1 having a current value set based on the first current source control value QDA1, and supplies the first current IS1 to the first charging circuit 110. The second current source circuit 142 generates the second current IS2 having a current value set based on the second current source control value QDA2, and supplies the second current IS2 to the second charging circuit 120.

FIG. 14 shows an operation explanatory diagram of the control circuit 160 according to the second embodiment. Determination of the current mode, control of the first enable signal XONS, and control of the second enable signal XONL are the same as those of the first embodiment.

When the current setting value INDA is less than the threshold value THR, the control circuit 160 outputs the first current source control value QDA1 based on the first setting value STV1 and sets the second current source control value QDA2 to zero. Accordingly, the charging current IBAT=ICH1 in the first charging mode is controlled by the first setting value STV1 corrected by the first correction. When the current setting value INDA is equal to or greater than the threshold value THR, the control circuit 160 outputs the second current source control value QDA2 based on the second setting value STV2 and sets the first current source control value QDA1 to zero. Accordingly, the charging current IBAT=ICH2 in the second charging mode is controlled by the second setting value STV2 corrected by the second correction.

Figure 15:
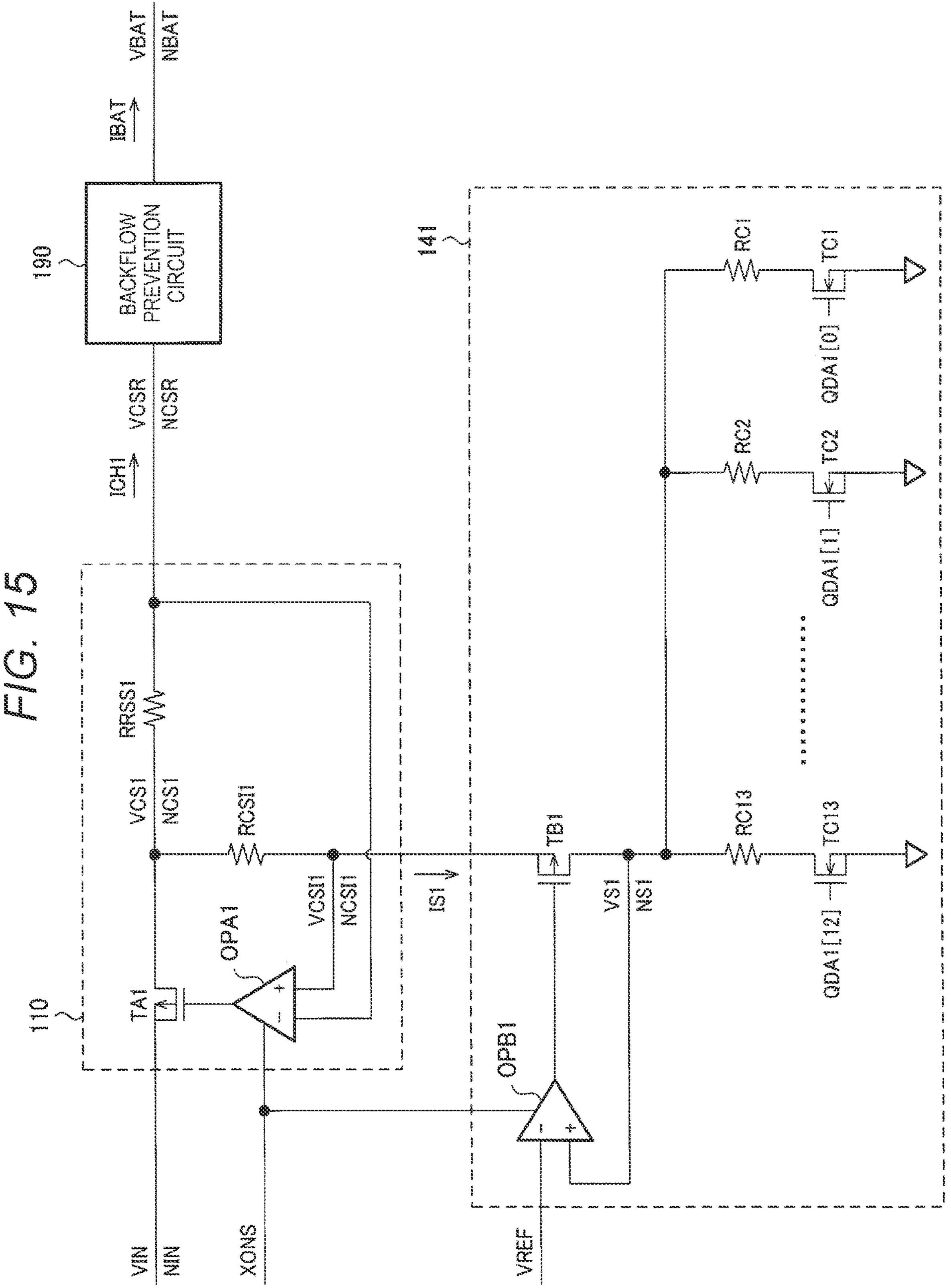
FIG. 15 shows a detailed configuration example of a first charging circuit and a first current source circuit.

FIG. 15 shows a detailed configuration example of the first charging circuit 110 and the first current source circuit 141. A configuration of the first charging circuit 110 is the same as that of the first embodiment.

The first current source circuit 141 includes an operational amplifier OPB1, a P-type transistor TB1, resistors RC1 to RC13, and N-type transistors TC1 to TC13.

A source of the P-type transistor TB1 is coupled to the node NCSI1, and a drain of the P-type transistor TB1 is coupled to a node NS1. The reference voltage VREF is input to an inverting input terminal of the operational amplifier OPB1. A non-inverting input terminal of the operational amplifier OPB1 is coupled to the node NS1, and an output node of the operational amplifier OPB1 is coupled to a gate of the P-type transistor TB1. One end of the resistor RC1 is coupled to the node NS1, and the other end of the resistor RC1 is coupled to a drain of the N-type transistor TC1. A source of the N-type transistor TC1 is coupled to a ground node. Similarly, one end of each of the resistors RC2 to RC13 is coupled to the node NS1, and the other end of each of the resistors RC2 to RC13 is coupled to a drain of each of the N-type transistors TC2 to TC13. A source of each of the N-type transistors TC2 to TC13 is coupled to the ground node. A control bit signal QDA1[0] of the first current source control value QDA1 is input to a gate of the N-type transistor TC1. Similarly, control bit signals QDA1[1] to QDA1[12] of the first current source control value QDA1 are input to gates of the N-type transistors TC2 to TC13.

The operational amplifier OPB1 is operationally enabled when the first enable signal XONS is active. Accordingly, a voltage of the node NS1 is VS1=VREF. The resistor RC1 and the N-type transistor TC1 are referred to as a first current source of the first current source circuit 141. When the control bit signal QDA[0] of the first current source control value QDA1 is 1, the N-type transistor TC1 is turned on, and the first current source causes a current of VREF/RC1 to flow. Similarly, the resistors RC2 to RC13 and the N-type transistors TC2 to TC13 are referred to as second to thirteenth current sources of the first current source circuit 141. When the control bit signals QDA1[1] to QDA1[12] of the first current source control value QDA1 are 1, the N-type transistors TC2 to TC13 are turned on, and the second to thirteenth current sources cause currents of VREF/RC2 to VREF/RC13 to flow. The first current IS1 flowing through the P-type transistor TB1 is a sum of currents flowing from the current sources corresponding to the control bit signal which is 1 among the control bit signals QDA1[0] to QDA1[12] of the first current source control value QDA1. The number of current sources included in the first current source circuit 141 is not limited to 13, and may be m. m is an integer of 2 or more and n or less.

When the first enable signal XONS is deactivated, the operational amplifiers OPA1 and OPB1 are operationally disabled. At this time, the P-type transistors TA1 and TB1 are turned off, and the first current IS1 and the first charging current ICH1 do not flow.

Figure 16:
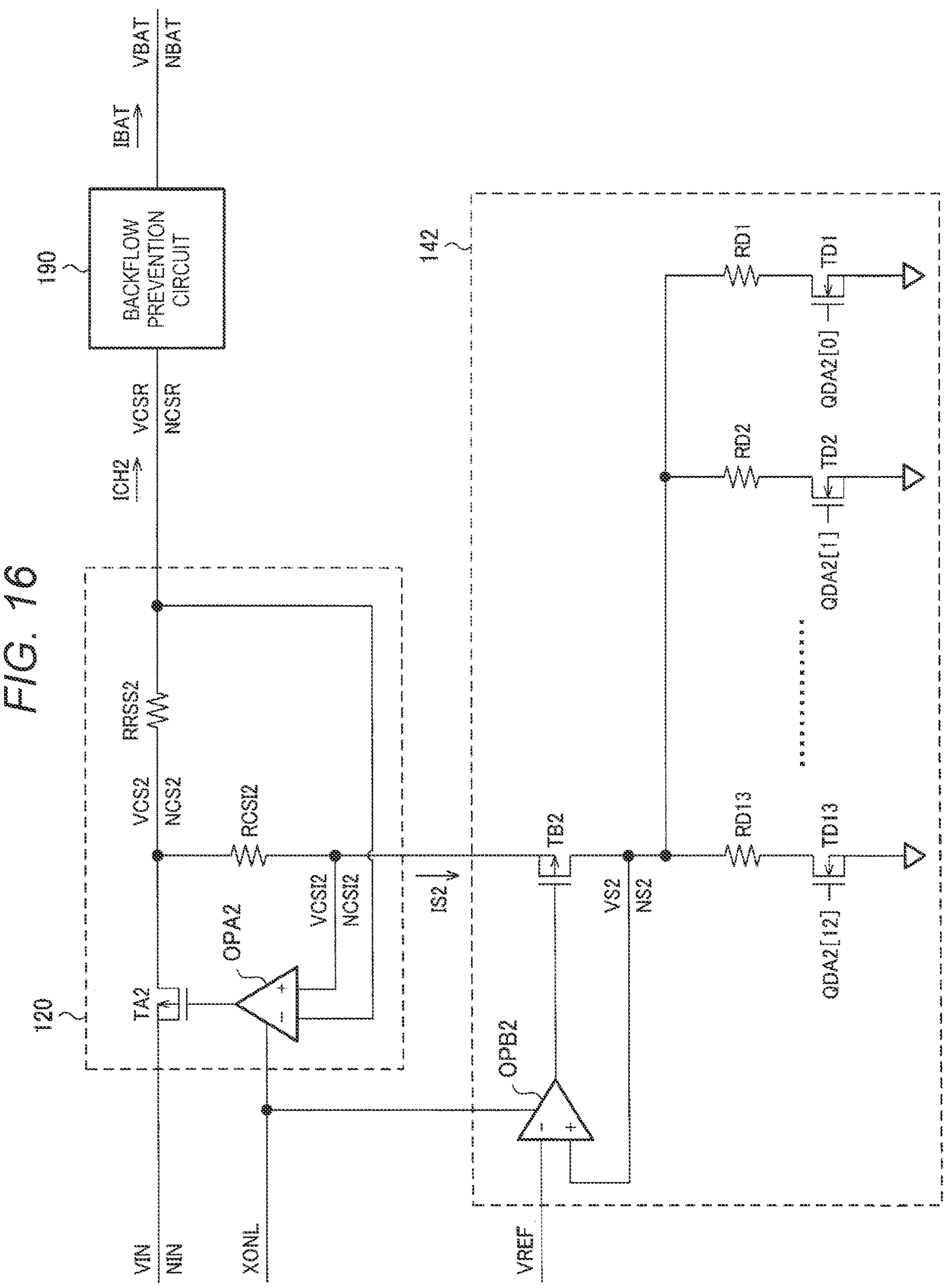
FIG. 16 shows a detailed configuration example of a second charging circuit and a second current source circuit.

FIG. 16 shows a detailed configuration example of the second charging circuit 120 and the second current source circuit 142. A configuration of the second charging circuit 120 is the same as that of the first embodiment.

The second current source circuit 142 includes an operational amplifier OPB2, a P-type transistor TB2, resistors RD1 to RD13, and N-type transistors TD1 to TD13.

A source of the P-type transistor TB2 is coupled to the node NCSI2, and a drain of the P-type transistor TB2 is coupled to a node NS2. The reference voltage VREF is input to an inverting input terminal of the operational amplifier OPB2. A non-inverting input terminal of the operational amplifier OPB2 is coupled to the node NS2, and an output node of the operational amplifier OPB2 is coupled to a gate of the P-type transistor TB2. One end of the resistor RD1 is coupled to the node NS2, and the other end of the resistor RD1 is coupled to a drain of the N-type transistor TD1. A source of the N-type transistor TD1 is coupled to the ground node. Similarly, one end of each of the resistors RD2 to RD13 is coupled to the node NS2, and the other end of each of the resistors RD2 to RD13 is coupled to a drain of each of the N-type transistors TD2 to TD13. A source of each of the N-type transistors TD2 to TD13 is coupled to the ground node. A control bit signal QDA2[0] of the second current source control value QDA2 is input to a gate of the N-type transistor TD1. Similarly, control bit signals QDA2[1] to QDA2[12] of the second current source control value QDA2 are input to gates of the N-type transistors TD2 to TD13.

The operational amplifier OPB2 is operationally enabled when the second enable signal XONL is active. Accordingly, a voltage of the node NS2 is VS2=VREF. The resistor RD1 and the N-type transistor TD1 are referred to as a first current source of the second current source circuit 142. When the control bit signal QDA2[0] of the second current source control value QDA2 is 1, the N-type transistor TD1 is turned on, and the first current source causes a current of VREF/RD1 to flow. Similarly, the resistors RD2 to RD13 and the N-type transistors TD2 to TD13 are referred to as second to thirteenth current sources of the second current source circuit 142. When the control bit signals QDA2[1] to QDA2[12] of the second current source control value QDA2 are 1, the N-type transistors TD2 to TD13 are turned on, and the second to thirteenth current sources cause currents of VREF/RD2 to VREF/RD13 to flow. The second current IS2 flowing through the P-type transistor TB2 is a sum of currents flowing from the current sources corresponding to the control bit signal which is 1 among the control bit signals QDA2[0] to QDA2[12] of the second current source control value QDA2. The number of current sources included in the second current source circuit 142 is not limited to 13, and may be n.

When the second enable signal XONL is deactivated, the operational amplifiers OPA2 and OPB2 are operationally disabled. At this time, the P-type transistors TA2 and TB2 are turned off, and the second current IS2 and the second charging current ICH2 do not flow.

Figure 17:
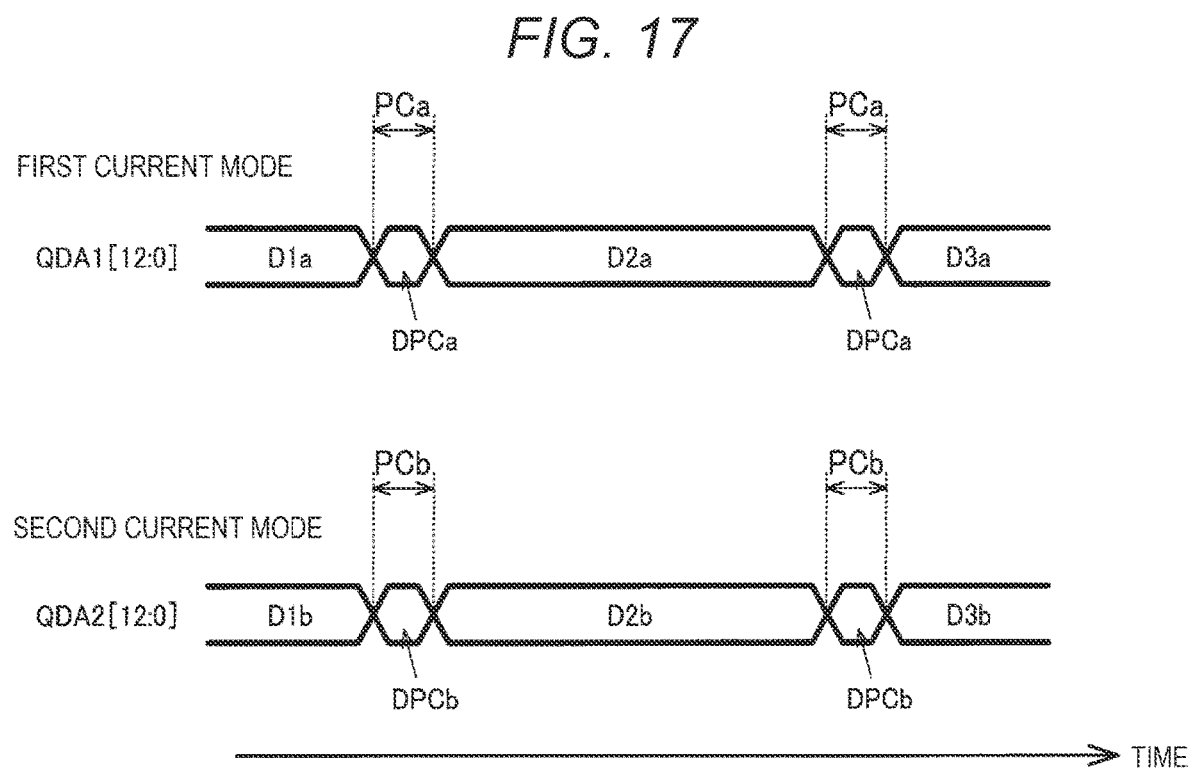

FIG. 17 shows a waveform example of the first current source control value QDA1 and the second current source control value QDA2 according to the second embodiment.

The control circuit 160 sets the first current source control value QDA1 to a predetermined value DPCa such that an output current of the first current source circuit 141 is zero or is reduced during a switching period PCa of the first current source control value QDA1 in a first current mode. The control circuit 160 sets the second current source control value QDA2 to a predetermined value DPCb such that an output current of the second current source circuit 142 is zero or is reduced during a switching period PCb of the second current source control value QDA2 in a second current mode.

Similar to FIG. 8 in the first embodiment, the control circuit 160 may set all bits of DPCa and DPCb to zero. Alternatively, similar to FIG. 9, the control circuit 160 may set upper (n−p+1) bits of DPCa and DPCb to zero. Similar to FIG. 10, the control circuit 160 may not provide the switching period PCa when changing the first current source control value QDA1 when QDA1≤GD, and may not provide the switching period PCb when changing the second current source control value QDA2 when QDA2≤GD.

FIG. 18 is a diagram showing resistance ratios and operations of the first current source circuit 141 and the second current source circuit 142 according to the second embodiment.

In the first current source circuit 141, a resistance ratio of the resistors RC1 to RC13 for determining a current ratio of the first to thirteenth current sources is RC13:RC12: . . . :RC2:RC1=0.25:0.5: . . . :512:1024. Since a reciprocal ratio thereof is the current ratio, the current flowing from the first to thirteenth current sources is weighted in binary. In a case of the first current mode, that is, when the first enable signal XONS is at a low level, the control circuit 160 assigns upper 13 bits of STV1[17:0] to the first current source control value QDA1, and outputs QDA1[12:0]=STV1[17:5] to the first current source circuit 141.

In the second current source circuit 142, a resistance ratio of the resistors RD1 to RD13 for determining a current ratio of the first to thirteenth current sources is RD13:RD12: . . . :RD2:RD1=0.25:0.5: . . . :512:1024. Since a reciprocal ratio thereof is the current ratio, the current flowing from the first to thirteenth current sources is weighted in binary. In a case of the second current mode, that is, when the second enable signal XONL is at a low level, the control circuit 160 assigns upper 13 bits of STV2[20:0] to the second current source control value QDA2, and outputs QDA2[12:0]=STV2[20:8] to the second current source circuit 142.

Comparing FIG. 18 in the second embodiment with FIG. 11 in the first embodiment, it is understood that the same operation as that of the first embodiment is substantially implemented in the second embodiment.

In the embodiment described above, the current source circuit 140 includes the first current source circuit 141 including m current sources and the second current source circuit 142 including n current sources. In the m current sources of the first current source circuit 141, output or non-output of the m constant currents, having current values weighted in binary, is controlled based on the first current source control value QDA1. In the n current sources of the second current source circuit 142, output or non-output of the n constant currents, having current values weighted in binary, is controlled based on the second current source control value QDA2. The control circuit 160 outputs the first current source control value QDA1 and the second current source control value QDA2 as the current source control value. During the switching period PCa of the first current source control value QDA1, the control circuit 160 sets the first current source control value QDA1 such that the m constant currents are not output, or sets the first current source control value QDA1 such that s constant currents on a high-current side among the m constant currents are not output. During the switching period PCb of the second current source control value QDA2, the control circuit 160 may set the second current source control value QDA2 such that the n constant currents are not output, or may set the second current source control value QDA2 such that t constant currents on a high-current side among the n constant currents are not output.

In the examples of FIGS. 15 to 18, m=n=13, and m may be an integer of 2 or more, and n may be an integer of m or more, and n may not be equal to m. In the examples of FIGS. 9 and 15 to 18, s=t=5, and s may be an integer of 1 or more and less than m, t may be an integer of 1 or more and less than n, and s may not be equal to t.

According to the embodiment, during the switching period PCa of the first current source control value QDA1, since the m constant currents are not output, the output current of the first current source circuit 141 is zero. Alternatively, during the switching period PCa of the first current source control value QDA1, since the s constant currents on the high-current side among the m constant currents are not output, the output current of the first current source circuit 141 is reduced. During the switching period PCb of the second current source control value QDA2, since the n constant currents are not output, the output current of the second current source circuit 142 is zero. Alternatively, during the switching period PCb of the second current source control value QDA2, since the t constant currents on the high-current side among the n constant currents are not output, the output current of the second current source circuit 142 is reduced.

In the embodiment, the control circuit 160 outputs an m-bit first current source control value QDA1 for controlling the m current sources of the first current source circuit 141 and an n-bit second current source control value QDA2 for controlling the n current sources of the second current source circuit 142. The first current source circuit 141 supplies, as the first current IS1 to the first charging circuit 110, a current from a current source selected, based on the m-bit first current source control value QDA1, from the m current sources. The second current source circuit 142 supplies, as the second current IS2 to the second charging circuit 120, a current from a current source selected, based on the n-bit second current source control value QDA2, from the n current sources.

According to the embodiment, the m-bit first current source control value QDA1 is output based on the current setting value INDA, and output or non-output of the m current sources in the first current source circuit 141 is controlled based on the m-bit first current source control value QDA1. Accordingly, in the first current mode, the current from the m current sources is output to the first charging circuit 110, so that the first charging circuit 110 supplies the first charging current ICH1 having a current value indicated by the current setting value INDA. In addition, the n-bit second current source control value QDA2 is output based on the current setting value INDA, and output or non-output of the n current sources in the second current source circuit 142 is controlled based on the n-bit second current source control value QDA2. Accordingly, in the second current mode, the current from the n current sources is output to the second charging circuit 120, so that the second charging circuit 120 supplies the second charging current ICH2 having a current value indicated by the current setting value INDA.

In the embodiment, the control circuit 160 sets, based on the current setting value INDA, the first setting value STV1 for setting the current value of the first charging current ICH1 and the second setting value STV2 for setting the current value of the second charging current ICH2. In the second current mode, the control circuit 160 outputs (i+1)-th to (i+n)-th bit signals STV2[$i$] to STV2[$i+n-1$] among the bit signals of the second setting value STV2 as the n-bit second current source control value QDA2. In the first current mode, the control circuit 160 outputs (i+1-k)-th to (i−k+m)-th bit signals STV1[$i-k$] to STV1[$i-k+m-1$] among the bit signals of the first setting value STV1 as the m-bit first current source control value QDA1.

In the examples of FIGS. 15 to 18, m=n=13, i=8, and k=3, and m may be an integer of 2 or more, n may be an integer of m or more, n may not be equal to m, i may be an integer of 1 or more, and k may be an integer of 1 or more and i or less.

According to the embodiment, as in the first embodiment, the resolution of the first current IS1 corresponding to the LSB of the current setting value INDA and the resolution of the second current IS2 corresponding to the LSB of the current setting value INDA are different. In the embodiment, since a difference in the resolution can be absorbed by a difference between the first gain of the first charging circuit 110 and the second gain of the second charging circuit 120, the resolution of the first charging current ICH1 corresponding to the LSB of the current setting value INDA and the resolution of the second charging current ICH2 corresponding to the LSB of the current setting value INDA can be set substantially equal.

The circuit device according to the embodiment described above includes a current source circuit, a first charging circuit, a second charging circuit, and a control circuit. The first charging circuit supplies, based on an output current of the current source circuit, a first charging current, which is a constant current, as a charging current to a charging node. The second charging circuit supplies, based on the output current of the current source circuit, a second charging current, which is a constant current greater than the first charging current, as the charging current to the charging node. The control circuit controls, when a current setting value for setting a current value of the charging current is in a first current range, a first current mode in which the first charging current having a current value indicated by the current setting value is supplied from the first charging circuit to the charging node. The control circuit controls, when the current setting value is in a second current range on a current side higher than the first current range, a second current mode in which the second charging current having a current value indicated by the current setting value is supplied from the second charging circuit to the charging node. The control circuit sets both the first charging current and the second charging current to a non-supply state during a switching period between the first current mode and the second current mode.

According to the embodiment, by switching between the first charging mode in which charging is performed by the first charging circuit and the second charging mode in which charging is performed by the second charging circuit according to the current setting value of the charging current, an optimal constant current charging circuit can be designed according to the current value of the charging current. Accordingly, an increase in a circuit scale, a decrease in the resolution of the charging current, or a decrease in power efficiency can be prevented while implementing a large charging current. The charging current may be an unintended large current when switching between the first current mode and the second current mode. According to the embodiment, since both the first charging current and the second charging current are in the non-supply state during the switching period between the first current mode and the second current mode, the charging current does not become an unintended large current.

In the embodiment, the control circuit may output a first enable signal for controlling the first charging current to a supply state or the non-supply state and a second enable signal for controlling the second charging current to the supply state or the non-supply state. During the switching period, the control circuit may set both the first charging current and the second charging current to the non-supply state by deactivating the first enable signal and the second enable signal.

During the switching period between the first current mode and the second current mode, the charging current may be an unintended large current due to a slight signal delay difference between the first enable signal and the second enable signal. According to the embodiment, the first enable signal and the second enable signal are set to be deactivated during the switching period. Accordingly, since both the first charging current and the second charging current are in the non-supply state, the charging current does not become an unintended large current.

In the embodiment, the first charging circuit may be controlled to be enabled or disabled based on the first enable signal, and may supply the first charging current to the charging node when enabled. The second charging circuit may be controlled to be enabled or disabled based on the second enable signal, and may supply the second charging current to the charging node when enabled. During the switching period, the control circuit may disable the first charging circuit and the second charging circuit by deactivating the first enable signal and the second enable signal.

According to the embodiment, during the switching period, since the first charging circuit and the second charging circuit are disabled, both the first charging current and the second charging current are in the non-supply state.

In the embodiment, the circuit device may include a first transistor and a second transistor. The first transistor may be controlled to be turned on or off based on the first enable signal, and may supply the output current from the current source circuit to the first charging circuit when turned on. The second transistor may be controlled to be turned on or off based on the second enable signal, and may supply the output current from the current source circuit to the second charging circuit when turned on. During the switching period, the control circuit may turn off the first transistor and the second transistor by deactivating the first enable signal and the second enable signal.

According to the embodiment, during the switching period, since the first transistor and the second transistor are turned off, no current is supplied from the current source circuit to the first charging circuit and the second charging circuit. Accordingly, both the first charging current and the second charging current are in the non-supply state.

In the embodiment, the control circuit may output, based on the current setting value, a current source control value for controlling the output current of the current source circuit to the current source circuit. In the first current mode, the current source circuit may supply, as the output current to the first charging circuit, a first current having a current value indicated by the current source control value. The first charging circuit may supply the first charging current by amplifying the first current with a first gain. In the second current mode, the current source circuit may supply, as the output current to the second charging circuit, a second current having a current value indicated by the current source control value. The second charging circuit may supply the second charging current by amplifying the second current with a second gain greater than the first gain.

According to the embodiment, since the second gain in the second current mode is greater than the first gain in the first current mode, the second charging current greater than the first charging current can be generated in the second current mode. In addition, since the first gain is smaller than the second gain, a resolution of the first current can be increased. Accordingly, the first charging current can be realized to have a higher-accuracy resolution. Although a resolution of the second current is smaller than the resolution of the first current, a value of a resolution of the second charging current is same as the resolution of the first charging current by separating the first charging circuit and the second charging circuit, and the first charging current ICH1 and the second charging current ICH2 can be realized to have a higher-accuracy resolution.

In the embodiment, the current source circuit may include first to n-th current sources, a first transistor, and a second transistor. n is an integer of 2 or more. In the first to n-th current sources, output or non-output of first to n-th constant currents, having current values weighted in binary, may be controlled based on first to n-th control bit signals of the current source control value. In the first current mode, the first transistor may supply, as the first current to the first charging circuit, a current from a current source selected, based on the first to n-th control bit signals, from the first to n-th current sources. In the second current mode, the second transistor may supply, as the second current to the second charging circuit, a current from a current source selected, based on the first to n-th control bit signals, from the first to n-th current sources.

According to the embodiment, the first to n-th control bit signals are output based on the current setting value, and output or non-output of the first to n-th current sources is controlled based on the first to n-th control bit signals. Accordingly, in the first current mode, the first transistor outputs the current from the first to n-th current sources to the first charging circuit, and therefore, the first charging circuit supplies the first charging current having the current value indicated by the current setting value. In the second current mode, the second transistor outputs the current from the first to n-th current sources to the second charging circuit, and therefore, the second charging circuit supplies the second charging current having the current value indicated by the current setting value.

In the embodiment, the control circuit may set, based on the current setting value, a first setting value for setting the current value of the first charging current and a second setting value for setting the current value of the second charging current. In the second current mode, the control circuit may output (i+1)-th to (i+n)-th bit signals among bit signals of the second setting value as the first to n-th control bit signals. i is an integer of 1 or more. In the first current mode, the control circuit may output (i+1−k)-th to (i−k+n)-th bit signals among bit signals of the first setting value as the first to n-th control bit signals. k is an integer of 1 or more and i or less.

According to the embodiment, the resolution of the first current and the resolution of the second current corresponding to an LSB of the current setting value are different. In the embodiment, since a difference in the resolution can be absorbed by a difference between the first gain of the first charging circuit and the second gain of the second charging circuit, the resolution of the first charging current corresponding to the LSB of the current setting value and the resolution of the second charging current corresponding to the LSB of the current setting value can be set substantially equal.

In the embodiment, the current source circuit may include a first current source circuit and a second current source circuit. The first current source circuit may include m current sources. In the m current sources, output or non-output of m constant currents, having current values weighted in binary, may be controlled based on an m-bit first current source control value. m is an integer of 2 or more. The second current source circuit may include n current sources. In the n current sources, output or non-output of n constant currents, having current values weighted in binary, may be controlled based on an n-bit second current source control value. n is an integer of m or more. The control circuit may output the m-bit first current source control value and the n-bit second current source control value as the current source control value. The first current source circuit may supply, as the first current to the first charging circuit, a current from a current source selected, based on the m-bit first current source control value, from the m current sources. The second current source circuit may supply, as the second current to the second charging circuit, a current from a current source selected, based on the n-bit second current source control value, from the n current sources.

According to the embodiment, the m-bit first current source control value is output based on the current setting value, and output or non-output of the m current sources in the first current source circuit is controlled based on the m-bit first current source control value. Accordingly, in the first current mode, a current from the m current sources is output to the first charging circuit, so that the first charging circuit supplies the first charging current having a current value indicated by the current setting value. In addition, the n-bit second current source control value is output based on the current setting value, and output or non-output of the n current sources in the second current source circuit is controlled based on the n-bit second current source control value. Accordingly, in the second current mode, a current from the n current sources is output to the second charging circuit, so that the second charging circuit supplies the second charging current having a current value indicated by the current setting value.

In the embodiment, the control circuit may set, based on the current setting value, a first setting value for setting the current value of the first charging current and a second setting value for setting the current value of the second charging current. The control circuit may output (i+1)-th to (i+n)-th bit signals among bit signals of the second setting value as the n-bit second current source control value. i is an integer of 1 or more. The control circuit may output (i+1−k)-th to (i−k+m)-th bit signals among bit signals of the first setting value as the m-bit first current source control value. k is an integer of 1 or more and i or less. m is an integer of 2 or more and n or less.

According to the embodiment, the resolution of the first current corresponding to the LSB of the current setting value and the resolution of the second current corresponding to the LSB of the current setting value are different. In the embodiment, since a difference in the resolution can be absorbed by a difference between the first gain of the first charging circuit and the second gain of the second charging circuit, the resolution of the first charging current corresponding to the LSB of the current setting value and the resolution of the second charging current corresponding to the LSB of the current setting value can be set substantially equal.

Further, an electronic device according to the embodiment includes the circuit device as described above and a battery coupled to the charging node.

Although the embodiments have been described in detail above, it will be easily understood by those skilled in the art that many modifications can be made without substantially departing from the novel matters and effects of the present disclosure. Therefore, all such modifications are within the scope of the present disclosure. For example, a term cited with a different term having a broader meaning or the same meaning at least once in the description or the drawings can be replaced with the different term at any place in the description or the drawings. All combinations of the embodiments and the modifications are also included in the scope of the present disclosure. Configurations and operations of the circuit device, the battery, the electronic device, and the like are not limited to those described in the embodiments, and various modifications can be made.

What is claimed is:

1. A circuit device comprising:

a current source circuit;

a first charging circuit configured to supply, based on an output current of the current source circuit, a first charging current as a charging current to a charging node;

a second charging circuit configured to supply, based on the output current of the current source circuit, a second charging current, which is greater than the first charging current, as the charging current to the charging node; and a control circuit, wherein the control circuit controls, when a current setting value for setting a current value of the charging current is in a first current range, a first current mode in which the first charging current having a current value indicated by the current setting value is supplied from the first charging circuit to the charging node, controls, when the current setting value is in a second current range on a current side higher than the first current range, a second current mode in which the second charging current having a current value indicated by the current setting value is supplied from the second charging circuit to the charging node, and sets both the first charging current and the second charging current to a non-supply state during a switching period between the first current mode and the second current mode.

2. The circuit device according to claim 1, wherein the control circuit outputs a first enable signal for controlling the first charging current to a supply state or the non-supply state and a second enable signal for controlling the second charging current to the supply state or the non-supply state, and during the switching period, sets both the first charging current and the second charging current to the non-supply state by deactivating the first enable signal and the second enable signal.

3. The circuit device according to claim 2, wherein the first charging circuit is controlled to be enabled or disabled based on the first enable signal, and supplies the first charging current to the charging node when enabled, the second charging circuit is controlled to be enabled or disabled based on the second enable signal, and supplies the second charging current to the charging node when enabled, and during the switching period, the control circuit disables the first charging circuit and the second charging circuit by deactivating the first enable signal and the second enable signal.

4. The circuit device according to claim 2, further comprising:

a first transistor which is controlled to be turned on or off based on the first enable signal, and configured to supply the output current from the current source circuit to the first charging circuit when turned on; and a second transistor which is controlled to be turned on or off based on the second enable signal, and configured to supply the output current from the current source circuit to the second charging circuit when turned on, wherein during the switching period, the control circuit turns off the first transistor and the second transistor by deactivating the first enable signal and the second enable signal.

5. The circuit device according to claim 1, wherein the control circuit outputs, based on the current setting value, a current source control value for controlling the output current of the current source circuit to the current source circuit, in the first current mode, the current source circuit supplies, as the output current to the first charging circuit, a first current having a current value indicated by the current source control value, and the first charging circuit supplies the first charging current by amplifying the first current with a first gain, and in the second current mode, the current source circuit supplies, as the output current to the second charging circuit, a second current having a current value indicated by the current source control value, and the second charging circuit supplies the second charging current by amplifying the second current with a second gain greater than the first gain.

6. The circuit device according to claim 5, wherein the current source circuit includes first to n-th current sources whose output or non-output of first to n-th constant currents, having current values weighted in binary, is controlled based on first to n-th control bit signals of the current source control value, n being an integer of 2 or more, in the first current mode, a first transistor that supplies, as the first current to the first charging circuit, a current from a current source selected, based on the first to n-th control bit signals, from the first to n-th current sources, and in the second current mode, a second transistor that supplies, as the second current to the second charging circuit, a current from a current source selected, based on the first to n-th control bit signals, from the first to n-th current sources.

7. The circuit device according to claim 6, wherein the control circuit sets, based on the current setting value, a first setting value for setting the current value of the first charging current and a second setting value for setting the current value of the second charging current, and the control circuit outputs, in the second current mode, (i+1)-th to (i+n)-th bit signals among bit signals of the second setting value as the first to n-th control bit signals, i being an integer of 1 or more, and outputs, in the first current mode, (i+1−k)-th to (i−k+n)-th bit signals among bit signals of the first setting value as the first to n-th control bit signals, k being an integer of 1 or more and i or less.

8. The circuit device according to claim 5, wherein the current source circuit includes a first current source circuit including m current sources whose output or non-output of m constant currents, having current values weighted in binary, is controlled based on an m-bit first current source control value, m being an integer of 2 or more, and a second current source circuit including n current sources whose output or non-output of n constant currents, having current values weighted in binary, is controlled based on an n-bit second current source control value, n being an integer of m or more, the control circuit outputs the m-bit first current source control value and the n-bit second current source control value as the current source control value, the first current source circuit supplies, as the first current to the first charging circuit, a current from a current source selected, based on the m-bit first current source control value, from the m current sources, and the second current source circuit supplies, as the second current to the second charging circuit, a current from a current source selected, based on the n-bit second current source control value, from the n current sources.

9. The circuit device according to claim 8, wherein the control circuit sets, based on the current setting value, a first setting value for setting the current value of the first charging current and a second setting value for setting the current value of the second charging current, and outputs (i+1)-th to (i+n)-th bit signals among bit signals of the second setting value as the n-bit second current source control value, i being an integer of 1 or more, and outputs (i+1−k)-th to (i−k+m)-th bit signals among bit signals of the first setting value as the m-bit first current source control value, k being an integer of 1 or more and i or less, and m being an integer of 2 or more and n or less.

10. An electronic device comprising:

the circuit device according to claim 1; and a battery coupled to the charging node.

* * * * *